(12) United States Patent
Jones et al.

(10) Patent No.: US 7,173,391 B2
(45) Date of Patent: Feb. 6, 2007

(54) METHOD AND SYSTEM FOR MULTI-MODE COVERAGE FOR AN AUTONOMOUS ROBOT

(75) Inventors: Joseph L. Jones, Acton, MA (US); Philip R. Mass, Denver, CO (US)

(73) Assignee: iRobot Corporation, Burlington, MA (US)

( * ) Notice: Subject to any disclaimer, the term of this patent is extended or adjusted under 35 U.S.C. 154(b) by 0 days.

(21) Appl. No.: 10/839,374

(22) Filed: May 5, 2004

(65) Prior Publication Data

US 2004/0207355 A1    Oct. 21, 2004

Related U.S. Application Data

(63) Continuation of application No. 10/167,851, filed on Jun. 12, 2002, now Pat. No. 6,809,490.

(60) Provisional application No. 60/297,718, filed on Jun. 12, 2001.

(51) Int. Cl.
 *B25J 5/00*    (2006.01)
(52) U.S. Cl. ............ 318/568.12; 318/568.11; 701/1; 701/23; 701/25; 701/26; 701/200; 901/1
(58) Field of Classification Search ........... 318/568.12, 318/568.11; 15/49.01; 700/243; 701/207, 701/1, 23, 25, 26, 200; 901/1
See application file for complete search history.

(56) References Cited

U.S. PATENT DOCUMENTS 4,119,900 A * 10/1978 Kremnitz ............... 701/23
4,674,048 A * 6/1987 Okumura ............... 701/25
5,012,886 A * 5/1991 Jonas et al. ............ 180/279
5,023,788 A * 6/1991 Kitazume et al. ........ 701/82
5,109,566 A   5/1992 Kobayashi et al. ........ 15/319
5,204,814 A   4/1993 Noonan et al. ....... 364/424.02
5,284,522 A   2/1994 Kobayashi et al. ......... 134/18
5,321,614 A   6/1994 Ashworth .......... 364/424.02
5,548,511 A   8/1996 Bancroft ............ 364/424.02
5,610,488 A * 3/1997 Miyazawa .......... 318/568.11
5,682,313 A  10/1997 Edlund et al. ...... 364/424.027

(Continued)

FOREIGN PATENT DOCUMENTS

DE    198 49 978 C2    2/2001

(Continued)

OTHER PUBLICATIONS

Karcher RC 3000 Cleaning Robot—user manual. Manufacturer: Alfred Karcher GmbH & Co., Cleaning Systems, Alfred-Karcher-Str. 28-40, P.O. Box 160, D-71349 Winnende, Germany, Dec. 2002.

(Continued)

*Primary Examiner*—Rita Leykin
(74) *Attorney, Agent, or Firm*—Fish & Richardson P.C.

(57) ABSTRACT

A control system for a mobile robot (10) is provided to effectively cover a given area by operating in a plurality of modes, including an obstacle following mode (51) and a random bounce mode (49). In other embodiments, spot coverage, such as spiraling (45), or other modes are also used to increase effectiveness. In addition, a behavior based architecture is used to implement the control system, and various escape behaviors are used to ensure full coverage.

12 Claims, 16 Drawing Sheets

U.S. PATENT DOCUMENTS

| | | | |
|---|---|---|---|
| 5,819,008 A * | 10/1998 | Asama et al. | 700/255 |
| 5,867,800 A * | 2/1999 | Leif | 701/23 |
| 5,935,179 A | 8/1999 | Kleiner et al. | 701/23 |
| 5,940,927 A | 8/1999 | Haegermarck et al. | 15/319 |
| 6,076,025 A * | 6/2000 | Ueno et al. | 701/23 |
| 6,076,226 A * | 6/2000 | Reed | 15/319 |
| 6,240,342 B1 | 5/2001 | Fiegert et al. | 700/25 |
| 6,327,741 B1 | 12/2001 | Reed | 15/319 |
| 6,338,013 B1 * | 1/2002 | Ruffner | 701/23 |
| 6,370,453 B2 * | 4/2002 | Sommer | 701/23 |
| 6,389,329 B1 | 5/2002 | Colens | 700/262 |
| 6,459,955 B1 * | 10/2002 | Bartsch et al. | 700/245 |
| 6,481,515 B1 | 11/2002 | Kirkpatrick et al. | 180/65.1 |
| 6,493,612 B1 | 12/2002 | Bisset et al. | 701/23 |
| 6,493,613 B2 | 12/2002 | Peless et al. | 701/23 |
| 6,574,536 B1 * | 6/2003 | Kawagoe et al. | 701/23 |
| 6,594,844 B2 * | 7/2003 | Jones | 15/49.1 |
| 6,605,156 B1 | 8/2003 | Clark et al. | 134/6 |
| 6,615,108 B1 | 9/2003 | Peless et al. | 700/245 |
| 6,671,592 B1 * | 12/2003 | Bisset et al. | 701/23 |
| 6,810,305 B2 * | 10/2004 | Kirkpatrick, Jr. | 700/245 |
| 2001/0047231 A1 | 11/2001 | Peless et al. | 701/23 |
| 2002/0049530 A1 * | 4/2002 | Poropat | 701/207 |

FOREIGN PATENT DOCUMENTS

| | | |
|---|---|---|
| DE | 19849 978 C2 | 2/2001 |
| JP | 60259895 | 6/1987 |
| JP | 60293095 | 7/1987 |
| JP | 63-183032 | 7/1988 |
| JP | 62074018 | 10/1988 |
| JP | 2-6312 | 1/1990 |
| JP | H05-046239 | 2/1993 |
| JP | H05-046246 | 2/1993 |
| JP | 6-3251 | 1/1994 |
| JP | H07-222705 | 8/1995 |
| JP | 7-295636 | 11/1995 |
| JP | H08-152916 | 6/1996 |
| JP | H09-160644 | 6/1997 |
| JP | 07338573 | 7/1997 |
| JP | 08000393 | 7/1997 |
| JP | 2555263 | 8/1997 |
| JP | 08016776 | 8/1997 |
| JP | 3375843 | 8/1998 |
| JP | 09043901 | 9/1998 |
| JP | H11-178764 | 7/1999 |
| JP | H11-178765 | 7/1999 |
| JP | H11-212642 | 8/1999 |
| JP | 11-510935 | 9/1999 |
| JP | H11-282532 | 10/1999 |
| JP | 2000-353014 | 12/2000 |
| JP | 11162454 | 12/2000 |
| JP | 2001-525567 | 12/2001 |
| JP | 2002-204768 | 7/2002 |
| JP | 2002-323925 | 11/2002 |
| JP | 2003-036116 | 2/2003 |
| JP | 2003-052596 | 2/2003 |
| JP | 2003-061882 | 3/2003 |
| WO | WO 97/40734 A1 | 11/1997 |
| WO | WO 97/41451 A1 | 11/1997 |
| WO | WO 99/38056 A1 | 7/1999 |
| WO | WO 99/59042 A1 | 11/1999 |
| WO | WO 00/38026 | 6/2000 |
| WO | WO 00/38029 | 6/2000 |
| WO | WO 00/78410 A1 | 12/2000 |
| WO | WO 01/06904 A1 | 2/2001 |
| WO | WO 02/39864 A1 | 5/2002 |
| WO | WO 02/067744 A1 | 9/2002 |
| WO | WO 02/075469 A1 | 9/2002 |
| WO | WO 02/075470 A1 | 9/2002 |
| WO | WO 03/040845 A1 | 5/2003 |
| WO | WO 03/040846 A1 | 5/2003 |

OTHER PUBLICATIONS

Doty, Keith L., et al., "Sweep Strategies for a Sensor-Driven, Behavior-Based Vacuum Cleaning Agent," AAAI 1993 Fall Symposium Series, US.

* cited by examiner

METHOD AND SYSTEM FOR MULTI-MODE COVERAGE FOR AN AUTONOMOUS ROBOT

This application for United States patent is a continuation of, and claims priority from, U.S. patent application Ser. No. 10/167,851 filed Jun. 12, 2002, now U.S. Pat. No. 6,809,490 entitled Method and System for Multi-Mode Coverage for an Autonomous Robot, and related U.S. Provisional Application for Patent Ser. No. 60/297,718 filed Jun. 12, 2001.

FIELD OF THE INVENTION

This invention relates generally to autonomous vehicles or robots, and more specifically to methods and mobile robotic devices for covering a specific area as might be required of, or used as, robotic cleaners or lawn mowers.

DESCRIPTION OF PRIOR ART

For purposes of this description, examples will focus on the problems faced in the prior art as related to robotic cleaning (e.g., dusting, buffing, sweeping, scrubbing, dry mopping or vacuuming). The claimed invention, however, is limited only by the claims themselves, and one of skill in the art will recognize the myriad of uses for the present invention beyond indoor, domestic cleaning.

Robotic engineers have long worked on developing an effective method of autonomous cleaning. By way of introduction, the performance of cleaning robots should concentrate on three measures of success: coverage, cleaning rate and perceived effectiveness. Coverage is the percentage of the available space visited by the robot during a fixed cleaning time, and ideally, a robot cleaner would provide 100 percent coverage given an infinite run time. Unfortunately, designs in the prior art often leave portions of the area uncovered regardless of the amount of time the device is allowed to complete its tasks. Failure to achieve complete coverage can result from mechanical limitations—e.g., the size and shape of the robot may prevent it from reaching certain areas—or the robot may become trapped, unable to vary its control to escape. Failure to achieve complete coverage can also result from an inadequate coverage algorithm. The coverage algorithm is the set of instructions used by the robot to control its movement. For the purposes of the present invention, coverage is discussed as a percentage of the available area visited by the robot during a finite cleaning time. Due to mechanical and/or algorithmic limitations, certain areas within the available space may be systematically neglected. Such systematic neglect is a significant limitation in the prior art.

A second measure of a cleaning robot's performance is the cleaning rate given in units of area cleaned per unit time. Cleaning rate refers to the rate at which the area of cleaned floor increases; coverage rate refers to the rate at which the robot covers the floor regardless of whether the floor was previously clean or dirty. If the velocity of the robot is v and the width of the robot's cleaning mechanism (also called work width) is w then the robot's coverage rate is simply wv, but its cleaning rate may be drastically lower.

A robot that moves in a purely randomly fashion in a closed environment has a cleaning rate that decreases relative to the robot's coverage rate as a function of time. This is because the longer the robot operates the more likely it is to revisit already cleaned areas. The optimal design has a cleaning rate equivalent to the coverage rate, thus minimizing unnecessary repeated cleanings of the same spot. In other words, the ratio of cleaning rate to coverage rate is a measure of efficiency and an optimal cleaning rate would mean coverage of the greatest percentage of the designated area with the minimum number of cumulative or redundant passes over an area already cleaned.

A third metric of cleaning robot performance is the perceived effectiveness of the robot. This measure is ignored in the prior art. Deliberate movement and certain patterned movement is favored as users will perceive a robot that contains deliberate movement as more effective.

While coverage, cleaning rate and perceived effectiveness are the performance criteria discussed herein, a preferred embodiment of the present invention also takes into account the ease of use in rooms of a variety of shapes and sizes (containing a variety of unknown obstacles) and the cost of the robotic components. Other design criteria may also influence the design, for example the need for collision avoidance and appropriate response to other hazards.

As described in detail in Jones, Flynn & Seiger, *Mobile Robots: Inspiration to Implementation* second edition, 1999, A K Peters, Ltd., and elsewhere, numerous attempts have been made to build vacuuming and cleaning robots. Each of these robots has faced a similar challenge: how to efficiently cover the designated area given limited energy reserves.

We refer to maximally efficient cleaning, where the cleaning rate equals the coverage rate, as deterministic cleaning. As shown in FIG. 1A, a robot 1 following a deterministic path moves in such a way as to completely cover the area 2 while avoiding all redundant cleaning. Deterministic cleaning requires that the robot know both where it is and where it has been; this in turn requires a positioning system. Such a positioning system—a positioning system suitably accurate to enable deterministic cleaning might rely on scanning laser rangers, ultrasonic transducers, carrier phase differential GPS, or other methods—can be prohibitively expensive and involve user set-up specific to the particular room geometries. Also, methods that rely on global positioning are typically incapacitated by the failure of any part of the positioning system.

One example of using highly sophisticated (and expensive) sensor technologies to create deterministic cleaning is the RoboScrub device built by Denning Mobile Robotics and Windsor Industries, which used sonar, infrared detectors, bump sensors and high-precision laser navigation. RoboScrub's navigation system required attaching large bar code targets at various positions in the room. The requirement that RoboScrub be able to see at least four targets simultaneously was a significant operational problem. RoboScrub, therefore, was limited to cleaning large open areas.

Another example, RoboKent, a robot built by the Kent Corporation, follows a global positioning strategy similar to RobotScrub. RoboKent dispenses with RobotScrub's more expensive laser positioning system but having done so RoboKent must restrict itself only to areas with a simple rectangular geometry, e.g. long hallways. In these more constrained regions, position correction by sonar ranging measurements is sufficient. Other deterministic cleaning systems are described, for example, in U.S. Pat. No. 4,119,900 (Kremnitz), U.S. Pat. No. 4,700,427 (Knepper), U.S. Pat. No. 5,353,224 (Lee et al.), U.S. Pat. No. 5,537,017 (Feiten et al.), U.S. Pat. No. 5,548,511 (Bancroft), U.S. Pat. No. 5,650,702 (Azumi).

Because of the limitations and difficulties of deterministic cleaning, some robots have relied on pseudo-deterministic cleaning schemes. One method of providing pseudo-deterministic cleaning is an autonomous navigation method known as dead reckoning. Dead reckoning consists of measuring the precise rotation of each robot drive wheel (using for example optical shaft encoders). The robot can then calculate its expected position in the environment given a known starting point and orientation. One problem with this technique is wheel slippage. If slippage occurs, the encoder on that wheel registers a wheel rotation even though that wheel is not driving the robot relative to the ground. As shown in FIG. 1B, as the robot 1 navigates about the room, these drive wheel slippage errors accumulate making this type of system unreliable for runs of any substantial duration. (The path no longer consists of tightly packed rows, as compared to the deterministic coverage shown in FIG. 1A.) The result of reliance on dead reckoning is intractable systematic neglect; in other words, areas of the floor are not cleaned.

One example of a pseudo-deterministic a system is the Cye robot from Probotics, Inc. Cye depends exclusively on dead reckoning and therefore takes heroic measures to maximize the performance of its dead reckoning system. Cye must begin at a user-installed physical registration spot in a known location where the robot fixes its position and orientation. Cye then keeps track of position as it moves away from that spot. As Cye moves, uncertainty in its position and orientation increase. Cye must make certain to return to a calibration spot before this error grows so large that it will be unlikely to locate a calibration spot. If a calibration spot is moved or blocked or if excessive wheel slippage occurs then Cye can become lost (possibly without realizing that it is lost). Thus Cye is suitable for use only in relatively small benign environments. Other examples of this approach are disclosed in U.S. Pat. No. 5,109,566 (Kobayashi et al.) and U.S. Pat. No. 6,255,793 (Peless et al.).

Another approach to robotic cleaning is purely random motion. As shown in FIG. 1C, in a typical room without obstacles, a random movement algorithm will provide acceptable coverage given significant cleaning time. Compared to a robot with a deterministic algorithm, a random cleaning robot must operate for a longer time to achieve acceptable coverage. To have high confidence that the random-motion robot has cleaned 98% of an obstacle-free room, the random motion robot must run approximately five times as long as a deterministic robot with the same cleaning mechanism moving at the same speed.

The coverage limitations of a random algorithm can be seen in FIG. 1D. An obstacle 5 in the room can create the effect of segmenting the room into a collection of chambers. The coverage over time of a random algorithm robot in such a room is analogous to the time density of gas released in one chamber of a confined volume. Initially, the density of gas is highest in the chamber where it is released and lowest in more distant chambers. Similarly the robot is most likely to thoroughly clean the chamber where it starts, rather than more distant chambers, early in the process. Given enough time a gas reaches equilibrium with equal density in all chambers. Likewise given time, the robot would clean all areas thoroughly. The limitations of practical power supplies, however, usually guarantee that the robot will have insufficient time to clean all areas of a space cluttered with obstacles. We refer to this phenomenon as the robot diffusion problem.

As discussed, the commercially available prior art has not been able to produce an effective coverage algorithm for an area of unknown geometry. As noted above, the prior art either has relied on sophisticated systems of markers or beacons or has limited the utility of the robot to rooms with simple rectangular geometries. Attempts to use pseudo-deterministic control algorithms can leave areas of the space systematically neglected.

OBJECTS AND ADVANTAGES

It is an object of the present invention to provide a system and method to allow a mobile robot to operate in a plurality of modes in order to effectively cover an area.

It is an object of the present invention to provide a mobile robot, with at least one sensor, to operate in a number of modes including spot-coverage, obstacle following and bounce.

It is a further object of the invention to provide a mobile robot that alternates between obstacle following and bounce mode to ensure coverage.

It is an object of the invention to return to spot-coverage after the robot has traveled a pre-determined distance.

It is an object of the invention to provide a mobile robot able to track the average distance between obstacles and use the average distance as an input to alternate between operational modes.

It is yet another object of the invention to optimize the distance the robot travels in an obstacle following mode as a function of the frequency of obstacle following and the work width of the robot, and to provide a minimum and maximum distance for operating in obstacle following mode.

It is an object of a preferred embodiment of the invention to use a control system for a mobile robot with an operational system program able to run a plurality of behaviors and using an arbiter to select which behavior is given control over the robot.

It is still another object of the invention to incorporate various escape programs or behavior to allow the robot to avoid becoming stuck.

Finally, it is an object of the invention to provide one or more methods for controlling a mobile robot to benefit from the various objects and advantages disclosed herein.

BRIEF DESCRIPTION OF THE DRAWINGS

These and further features of the present invention will be apparent with reference to the accompanying drawings, wherein.

DESCRIPTION OF INVENTION

In the present invention, a mobile robot is designed to provide maximum coverage at an effective coverage rate in a room of unknown geometry. In addition, the perceived effectiveness of the robot is enhanced by the inclusion of patterned or deliberate motion. In addition, in a preferred embodiment, effective coverage requires a control system able to prevent the robot from becoming immobilized in an unknown environment.

Figure 1A:
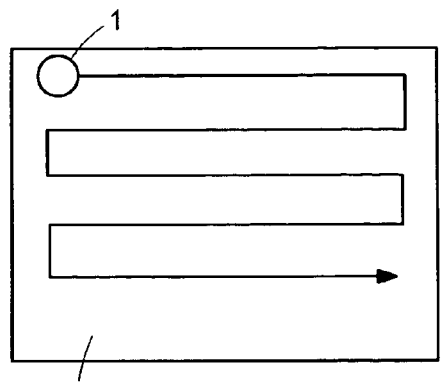
FIGS. 1A–D illustrate coverage patterns of various robots in the prior art.
Figure 1B:
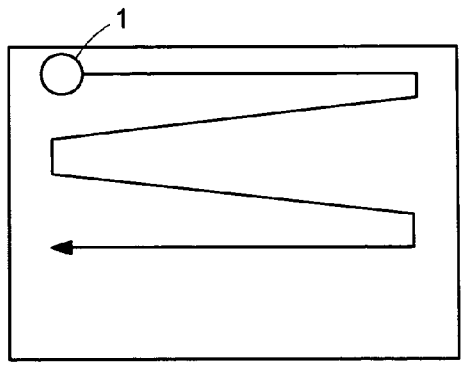
Figure 1C:
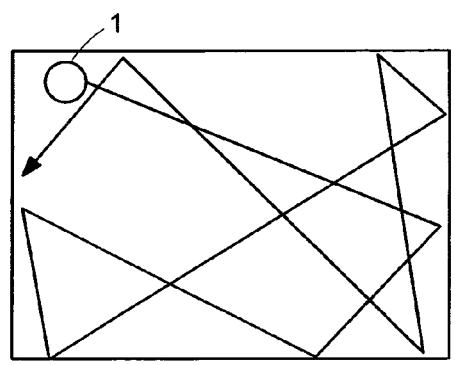
Figure 1D:
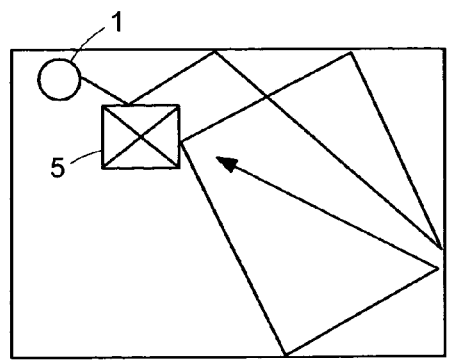
Figure 2:
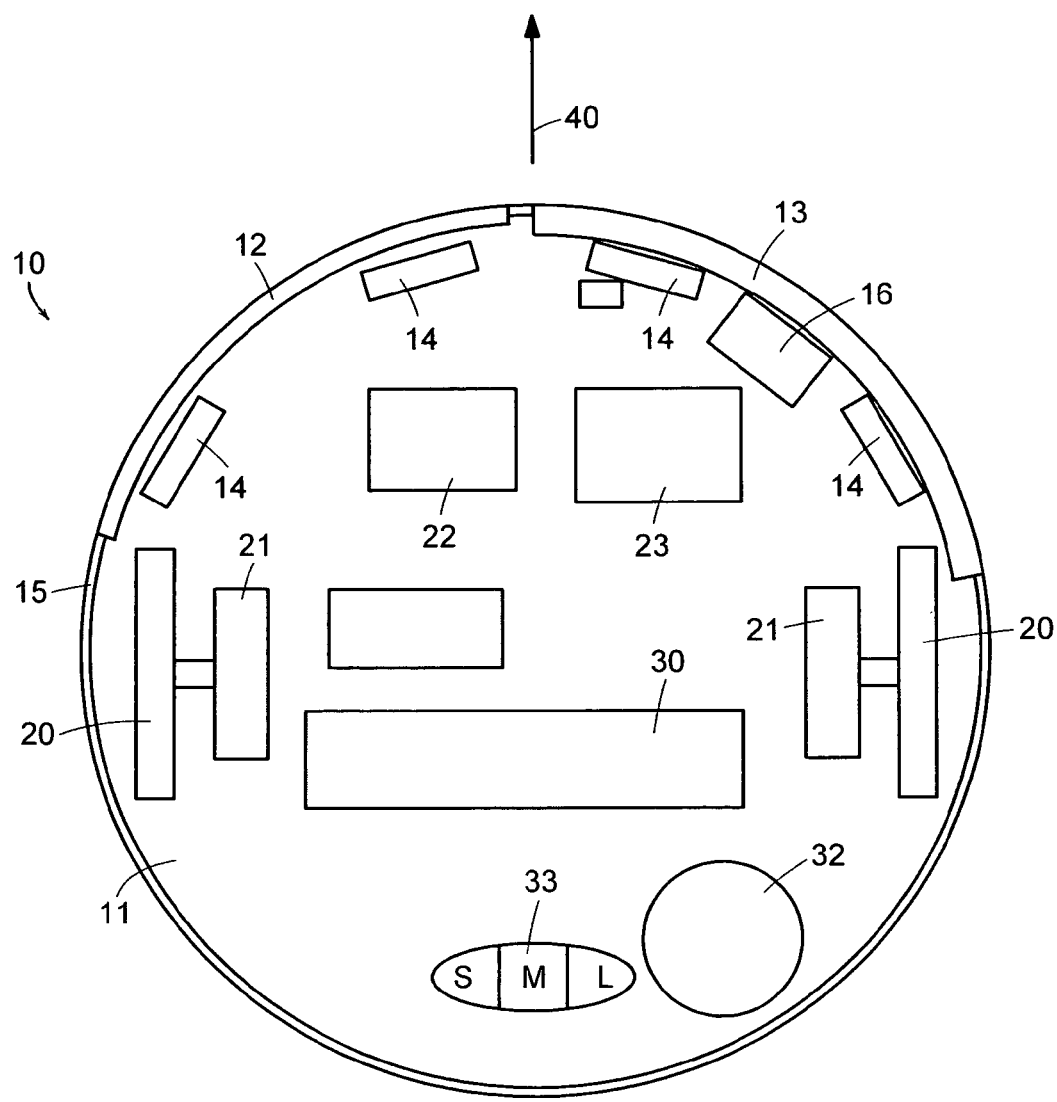
FIG. 2 is a top-view schematic representation of the basic components of a mobile robot used in a preferred embodiment of the invention.

While the physical structures of mobile robots are known in the art, the components of a preferred, exemplary embodiment of the present invention is described herein. A preferred embodiment of the present invention is a substantially circular robotic sweeper containing certain features. As shown in FIG. 2, for example, the mobile robot 10 of a preferred embodiment includes a chassis 11 supporting mechanical and electrical components. These components include various sensors, including two bump sensors 12 & 13 located in the forward portion of the robot, four cliff sensors 14 located on the robot shell 15, and a wall following sensor 16 mounted on the robot shell 15. In other embodiments, as few as one sensor may be used in the robot. One of skill in the art will recognize that the sensor(s) may be of a variety of types including sonar, tactile, electromagnetic, capacitive, etc. Because of cost restraints, a preferred embodiment of the present invention uses bump (tactile) sensors 12 & 13 and reflective IR proximity sensors for the cliff sensors 14 and the wall-following sensor 16. Details of the IR sensors are described in U.S. patent application U.S. Ser. No. 09/768,773, which disclosure is hereby incorporated by reference.

A preferred embodiment of the robot also contains two wheels 20, motors 21 for driving the wheels independently, an inexpensive low-end microcontroller 22, and a rechargeable battery 23 or other power source known in the art. These components are well known in the art and are not discussed in detail herein. The robotic cleaning device 10 further includes one or more cleaning heads 30. The cleaning head might contain a vacuum cleaner, various brushes, sponges, mops, electrostatic cloths or a combination of various cleaning elements. The embodiment shown in FIG. 2 also includes a side brush 32.

As mentioned above, a preferred embodiment of the robotic cleaning device 10 comprises an outer shell 15 defining a dominant side, non-dominant side, and a front portion of the robot 10. The dominant side of the robot is the side that is kept near or in contact with an object (or obstacle) when the robot cleans the area adjacent to that object (or obstacle). In a preferred embodiment, as shown in FIG. 1, the dominant side of the robot 10 is the right-hand side relative to the primary direction of travel, although in other embodiments the dominant side may be the left-hand side. In still other embodiments, the robot may be symmetric and thereby does not need a dominant side; however, in a preferred embodiment, a dominant side is chosen for reasons of cost. The primary direction of travel is as shown in FIG. 2 by arrow 40.

In a preferred embodiment, two bump sensors 12 & 13 are located forward of the wheels 20 relative to the direction of forward movement, shown by arrow 40. One bump sensor 13 is located on the dominant side of the robot 10 and the other bump sensor 12 is located on the non-dominant side of the robot 10. When both of these bump sensors 12 & 13 are activated simultaneously, the robot 10 recognizes an obstacle in the front position. In other embodiments, more or fewer individual bump sensors can be used. Likewise, any number of bump sensors can be used to divide the device into any number of radial segments. While in a preferred embodiment the bump sensors 12 & 13 are IR break beam sensors activated by contact between the robot 10 and an obstacle, other types of sensors can be used, including mechanical switches and capacitive sensors that detect the capacitance of objects touching the robot or between two metal plates in the bumper that are compressed on contact. Non-contact sensors, which allow the robot to sense proximity to objects without physically touching the object, such as capacitive sensors or a curtain of IR light, can also be used.

It is useful to have a sensor or sensors that are not only able to tell if a surface has been contacted (or is nearby), but also the angle relative to the robot at which the contact was made. In the case of a preferred embodiment, the robot is able to calculate the time between the activation of the right and left bump switches 12 & 13, if both are activated. The robot is then able to estimate the angle at which contact was made. In a preferred embodiment shown in FIG. 4A, the bump sensor comprises a single mechanical bumper 44 at the front of the robot with sensors 42 & 43 substantially at the two ends of the bumper that sense the movement of the bumper. When the bumper is compressed, the timing between the sensor events is used to calculate the approximate angle at which the robot contacted the obstacle. When the bumper is compressed from the right side, the right bump sensor detects the bump first, followed by the left bump sensor, due to the compliance of the bumper and the bump detector geometry. This way, the bump angle can be approximated with only two bump sensors.

Figure 4A:
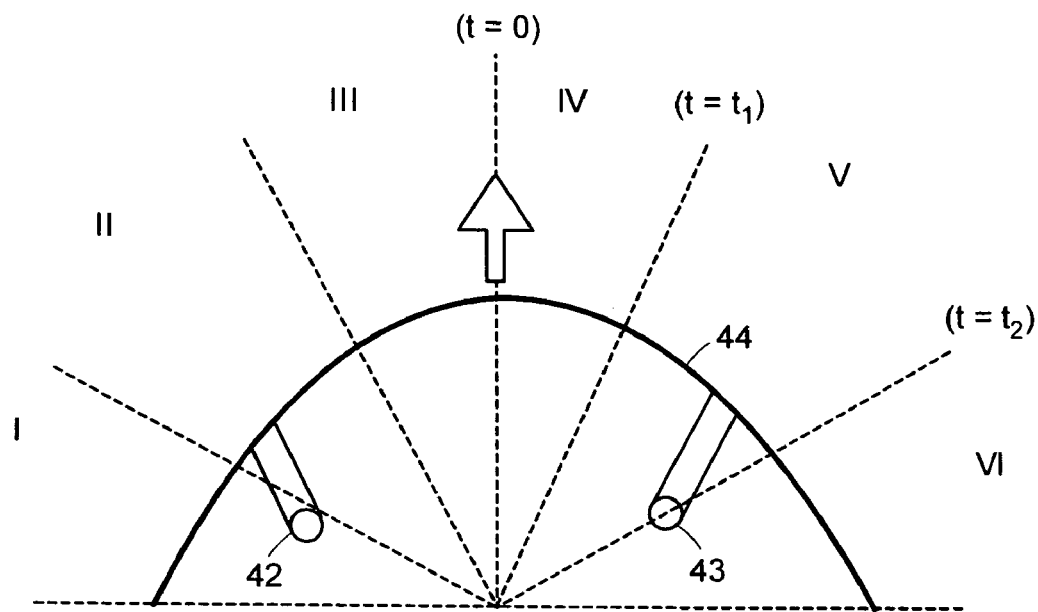
FIG. 4A is a diagram showing a method of determining the angle at which the robot encounters an obstacle.

For example, in FIG. 4A, bump sensors 42 & 43 are able to divide the forward portion of the robot into six regions (I–VI). When a bump sensor is activated, the robot calculates the time before the other sensor is activated (if at all). For example, when the right bump sensor 43 is activated, the robot measures the time (t) before the left bump sensor 42 is activated. If t is less than $t_1$, then the robot assumes contact occurred in region IV. If t is greater than or equal to $t_1$ and less than $t_2$, then the robot assumes contact was made in region V. If t is greater than or equal to $t_2$ (including the case of where the left bump sensor 42 is not activated at all within the time monitored), then the robot assumes the contact occurred in region VI. If the bump sensors are activated simultaneously, the robot assumes the contact was made from straight ahead. This method can be used the divide the bumper into an arbitrarily large number of regions (for greater precision) depending on of the timing used and geometry of the bumper. As an extension, three sensors can be used to calculate the bump angle in three dimensions instead of just two dimensions as in the preceding example.

A preferred embodiment also contains a wall-following or wall-detecting sensor 16 mounted on the dominant side of the robot 10. In a preferred embodiment, the wall following sensor is an IR sensor composed of an emitter and detector pair collimated so that a finite volume of intersection occurs at the expected position of the wall. This focus point is approximately three inches ahead of the drive wheel in the direction of robot forward motion. The radial range of wall detection is about 0.75 inches.

A preferred embodiment also contains any number of IR cliff sensors 14 that prevent the device from tumbling over stairs or other vertical drops. These cliff sensors are of a construction similar to that of the wall following sensor but directed to observe the floor rather than a wall. As an additional safety and sensing measure, the robot 10 includes a wheel-drop sensor that is able to detect if one or more wheels is unsupported by the floor. This wheel-drop sensor can therefore detect not only cliffs but also various obstacles upon which the robot is able to drive, such as lamps bases, high floor transitions, piles of cords, etc.

Other embodiments may use other known sensors or combinations of sensors.

Figure 3:
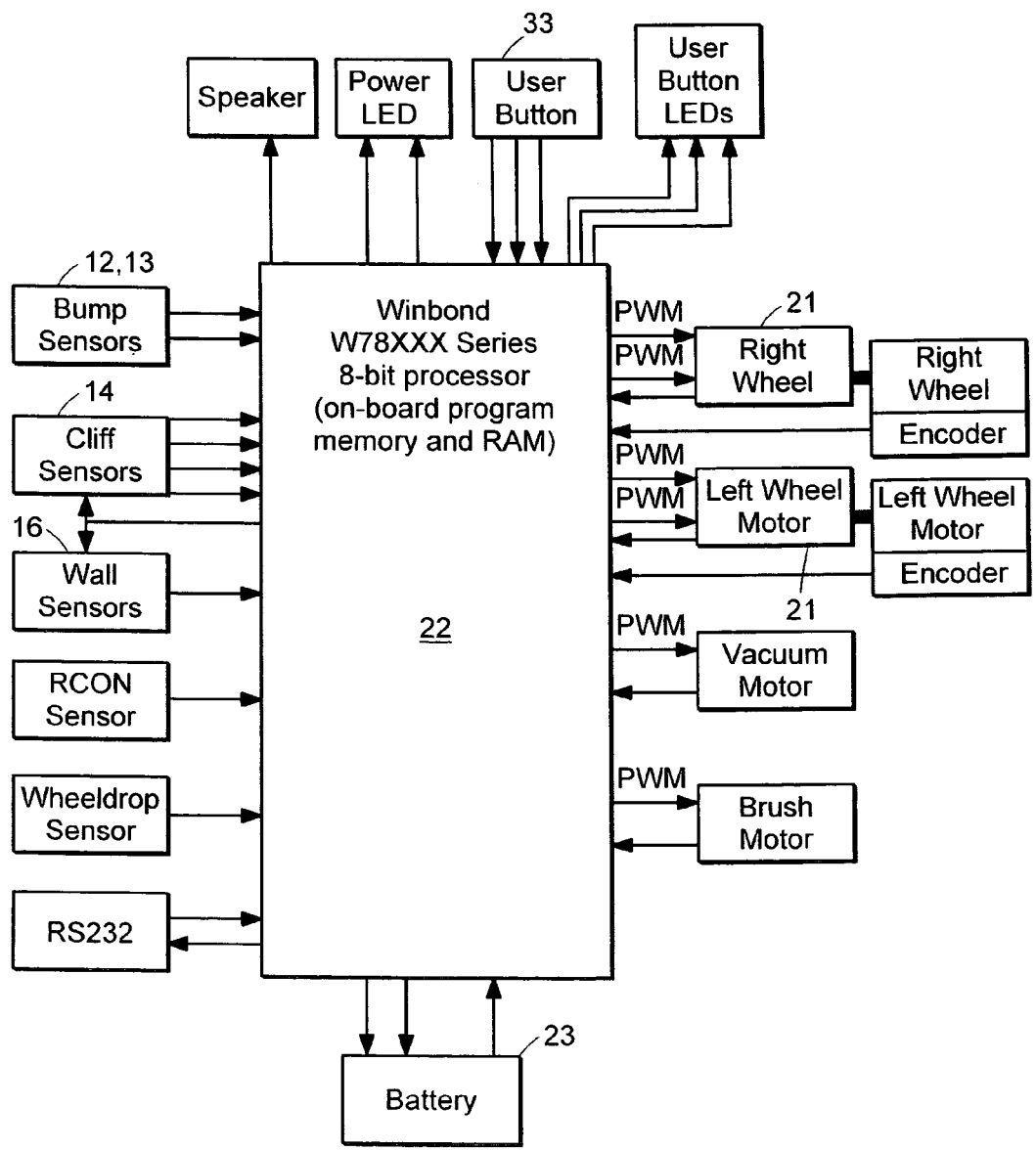
FIG. 3 demonstrates a hardware block diagram of the robot shown in FIG. 2.

FIG. 3 shows a hardware block diagram of the controller and robot of a preferred embodiment of the invention. In a preferred embodiment, a Winbond W78XXX series processor is used. It is a microcontroller compatible with the MCS-51 family with 36 general purpose I/O ports, 256 bytes of RAM and 16K of ROM. It is clocked at 40 MHZ which is divided down for a processor speed of 3.3 MHz. It has two timers which are used for triggering interrupts used to process sensors and generate output signals as well as a watchdog timer. The lowest bits of the fast timer are also used as approximate random numbers where needed in the behaviors. There are also two external interrupts which are used to capture the encoder inputs from the two drive wheels. The processor also has a UART which is used for testing and debugging the robot control program.

The I/O ports of the microprocessor are connected to the sensors and motors of the robot and are the interface connecting it to the internal state of the robot and its environment. For example, the wheel drop sensors are connected to an input port and the brush motor PWM signal is generated on an output port. The ROM on the microprocessor is used to store the coverage and control program for the robot. This includes the behaviors (discussed below), sensor processing algorithms and signal generation. The RAM is used to store the active state of the robot, such as the average bump distance, run time and distance, and the ID of the behavior in control and its current motor commands.

Figure 4B:
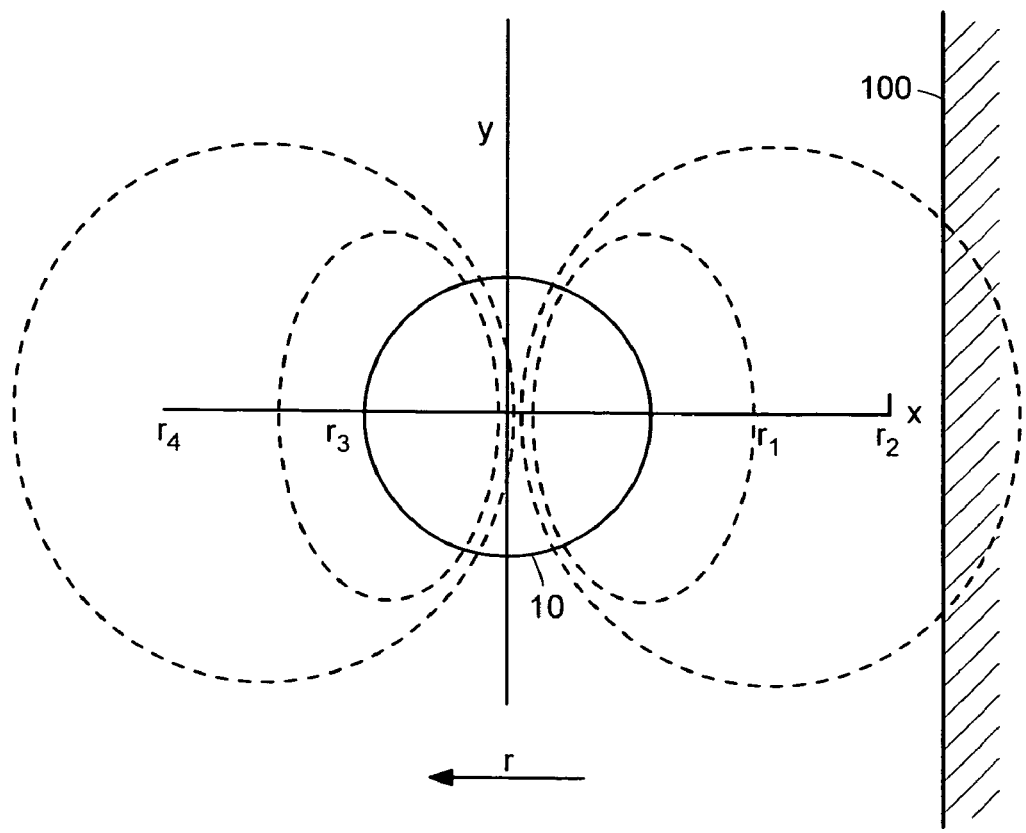
FIG. 4B is a diagram showing the orientation of a preferred embodiment of the robot control system.

For purposes of understanding the movement of the robotic device, FIG. 4B shows the orientation of the robot 10 centered about the x and y axes in a coordinate plane; this coordinate system is attached to the robot. The directional movement of the robot 10 can be understood to be the radius at which the robot 10 will move. In order to rapidly turn away from the wall 100, the robot 10 should set a positive, small value of r ($r_3$ in FIG. 4B); in order to rapidly turn toward the wall, the robot should set a negative, small value of r ($r_1$ in FIG. 4B). On the other hand, to make slight turns, the robot should set larger absolute values for r—positive values to move left (i.e. away from the wall, $r_4$ in FIG. 4B) and negative values to move right (i.e. toward the wall, ($r_2$ in FIG. 4B). This coordinate scheme is used in the examples of control discussed below. The microcontroller 22 controlling differential speed at which the individual wheel motors 21 are run, determines the turning radius.

Also, in certain embodiments, the robot may include one or more user inputs. For example, as shown in FIG. 2, a preferred embodiment includes three simple buttons 33 that allow the user to input the approximate size of the surface to be covered. In a preferred embodiment, these buttons labeled "small," "medium," and "large" correspond respectively to rooms of 11.1, 20.8 and 27.9 square meters.

As mentioned above, the exemplary robot is a preferred embodiment for practicing the instant invention, and one of skill in the art is able to choose from elements known in the art to design a robot for a particular purpose. Examples of suitable designs include those described in the following U.S. Pat. No. 4,306,329 (Yokoi), U.S. Pat. No. 5,109,566 (Kobayashi et al.), U.S. Pat. No. 5,293,955 (Lee), 5,369,347 (Yoo), U.S. Pat. No. 5,440,216 (Kim), U.S. Pat. No. 5,534,762 (Kim), U.S. Pat. No. 5,613,261 (Kawakami et al), U.S. Pat. No. 5,634,237 (Paranjpe), U.S. Pat. No. 5,781,960 (Kilstrom et al.), U.S. Pat. No. 5,787,545 (Colens), U.S. Pat. No. 5,815,880 (Nakanishi), U.S. Pat. No. 5,839,156 (Park et al.), U.S. Pat. No. 5,926,909 (McGee), U.S. Pat. No. 6,038,501 (Kawakami), U.S. Pat. No. 6,076,226 (Reed), all of which are hereby incorporated by reference.

Figure 5:
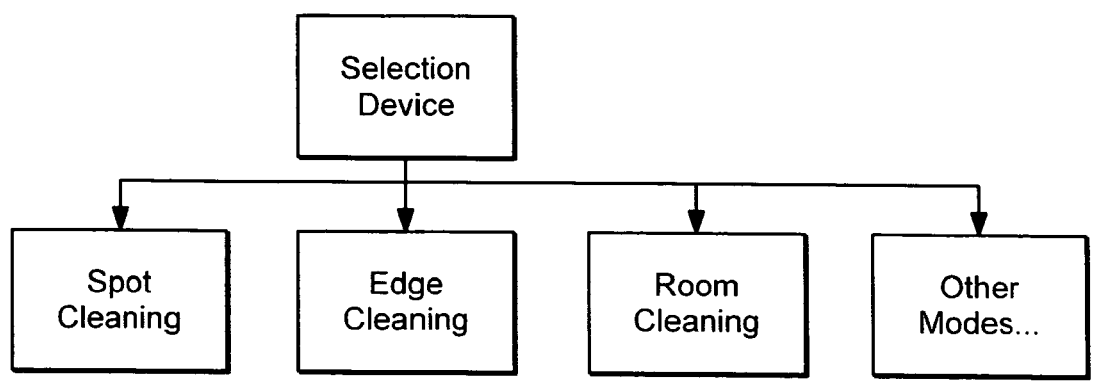
FIG. 5 is a schematic representation of the operational modes of the instant invention.

FIG. 5 shows a simple block representation of the various operational modes of a device. In a preferred embodiment, and by way of example only, operational modes may include spot cleaning (where the user or robot designates a specific region for cleaning), edge cleaning, and room cleaning. Each operational mode comprises complex combinations of instructions and/or internal behaviors, discussed below. These complexities, however, are generally hidden from the user. In one embodiment, the user can select the particular operational mode by using an input element, for example, a selector switch or push button. In other preferred embodiments, as described below, the robot is able to autonomously cycle through the operational modes.

The coverage robot of the instant invention uses these various operational modes to effectively cover the area. While one of skill in the art may implement these various operational modes in a variety of known architectures, a preferred embodiment relies on behavior control. Here, behaviors are simply layers of control systems that all run in parallel. The microcontroller 22 then runs a prioritized arbitration scheme to resolve the dominant behavior for a given scenario. A description of behavior control can be found in *Mobile Robots*, supra, the text of which is hereby incorporated by reference.

In other words, in a preferred embodiment, the robot's microprocessor and control software run a number of behaviors simultaneously. Depending on the situation, control of the robot will be given to one or more various behaviors. For purposes of detailing the preferred operation of the present invention, the behaviors will be described as (1) coverage behaviors, (2) escape behaviors or (3) user/safety behaviors. Coverage behaviors are primarily designed to allow the robot to perform its coverage operation in an efficient manner. Escape behaviors are special behaviors that are given priority when one or more sensor inputs suggest that the robot may not be operating freely. As a convention for this specification, behaviors discussed below are written in all capital letters.

1. Coverage Behaviors

FIGS. 6–14 show the details of each of the preferred operational modes: Spot Coverage, Wall Follow (or Obstacle Follow) and Room Coverage.

Operational Mode: Spot Coverage

Spot coverage or, for example, spot cleaning allows the user to clean an isolated dirty area. The user places the robot 10 on the floor near the center of the area (see reference numeral 40 in FIGS. 6A, 6B) that requires cleaning and selects the spot-cleaning operational mode. The robot then moves in such a way that the immediate area within, for example, a defined radius, is brought into contact with the cleaning head 30 or side brush 32 of the robot.

Figure 6A:
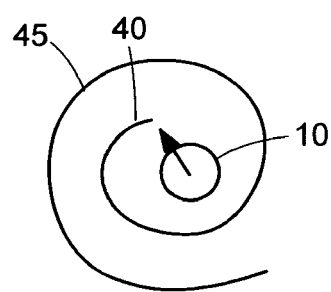
FIG. 6A is a schematic representation of the coverage pattern for a preferred embodiment of SPIRAL behavior.
Figure 6B:
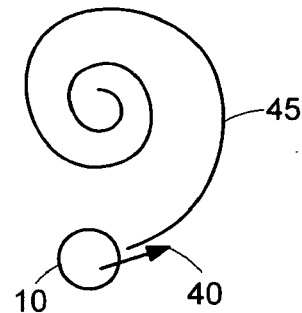
FIG. 6B is a schematic representation of the coverage pattern for an alternative embodiment of SPIRAL behavior.

In a preferred embodiment, the method of achieving spot cleaning is a control algorithm providing outward spiral movement, or SPIRAL behavior, as shown in FIG. 6A. In general, spiral movement is generated by increasing the turning radius as a function of time. In a preferred embodiment, the robot 10 begins its spiral in a counter-clockwise direction, marked in FIG. 6A by movement line 45, in order to keep the dominant side on the outward, leading-edge of the spiral. In another embodiment, shown in FIG. 6B, spiral movement of the robot 10 is generated inward such that the radius of the turns continues to decrease. The inward spiral is shown as movement line 45 in FIG. 6B. It is not necessary, however, to keep the dominant side of the robot on the outside during spiral motion.

Figure 7:
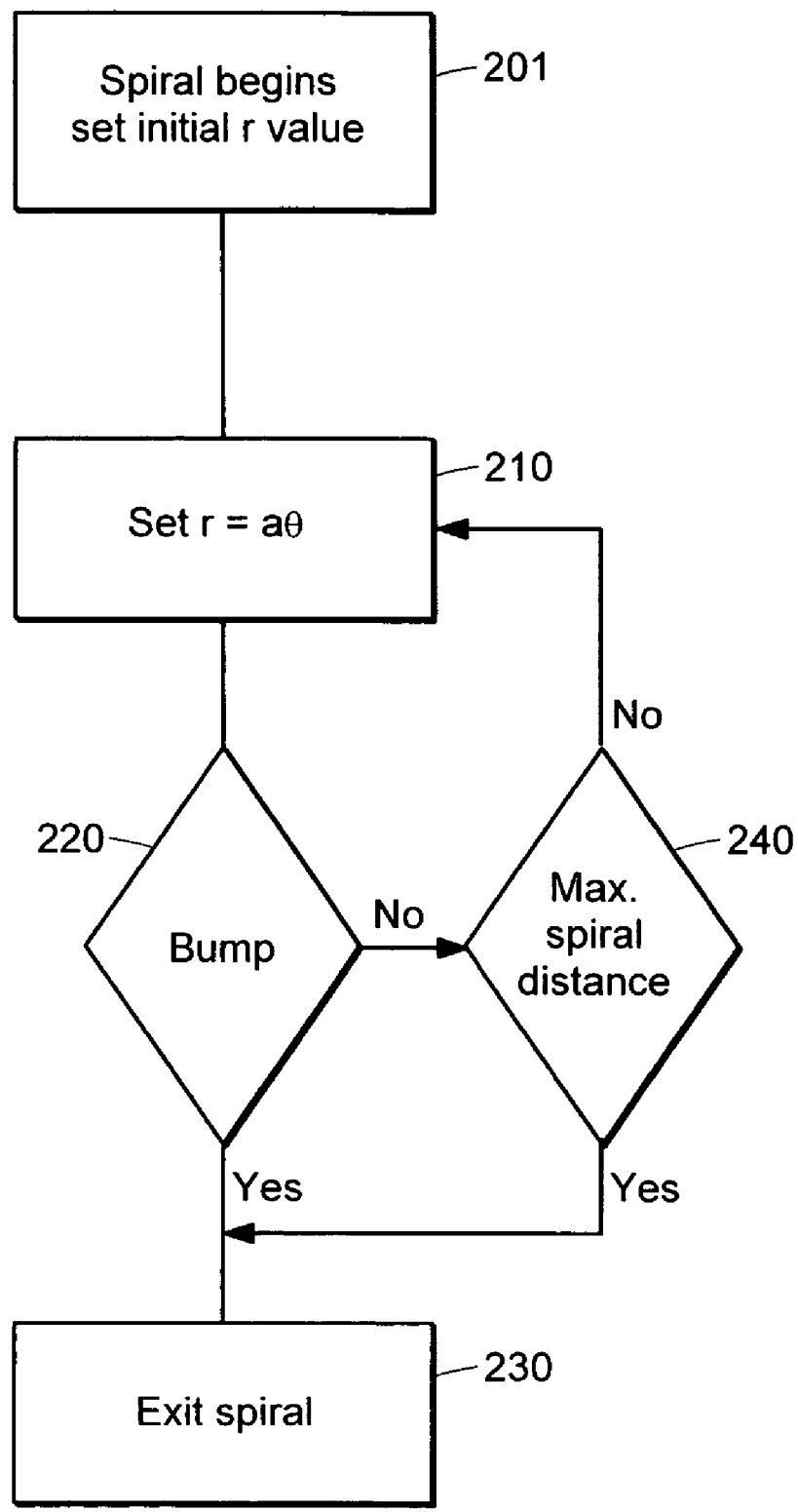
FIG. 7 is a flow-chart illustration of the spot-coverage algorithm of a preferred embodiment of the invention.

The method of spot cleaning used in a preferred embodiment—outward spiraling—is set forth in FIG. 7. Once the spiraling is initiated (step 201) and the value of r is set at its minimum, positive value (which will produce the tightest possible counterclockwise turn), the spiraling behavior recalculates the value of r as a function of $\cdot$, where $\cdot$ represents the angular turning since the initiation of the spiraling behavior (step 210). By using the equation r=a·, where a is a constant coefficient, the tightness or desired overlap of the spiral can be controlled. (Note that · is not normalized to 2·). The value of a can be chosen by the equation $$a = \frac{d}{2 \cdot};$$

where d is the distance between two consecutive passes of the spiral. For effective cleaning, a value for d should be chosen that is less than the width of the cleaning mechanism 30. In a preferred embodiment, a value of d is selected that is between one-half and two-thirds of the width of the cleaning head 30.

In other embodiments, the robot tracks its total distance traveled in spiral mode. The spiral will deteriorate after some distance, i.e. the centerpoint of the spiral motion will tend to drift over time due to surface dependant wheel slippage and/or inaccuracies in the spiral approximation algorithm and calculation precision. In certain embodiments, therefore, the robot may exit spiral mode after the robot has traveled a specific distance ("maximum spiral distance"), such as 6.3 or 18.5 meters (step 240). In a preferred embodiment, the robot uses multiple maximum spiral distances depending on whether the robot is performing an initial spiral or a later spiral. If the maximum spiral distance is reached without a bump, the robot gives control to a different behavior, and the robot, for example, then continues to move in a predominately straight line. (In a preferred embodiment, a STRAIGHT LINE behavior is a low priority, default behavior that propels the robot in an approximate straight line at a preset velocity of approximately 0.306 m/s when no other behaviors are active.

Figure 6C:
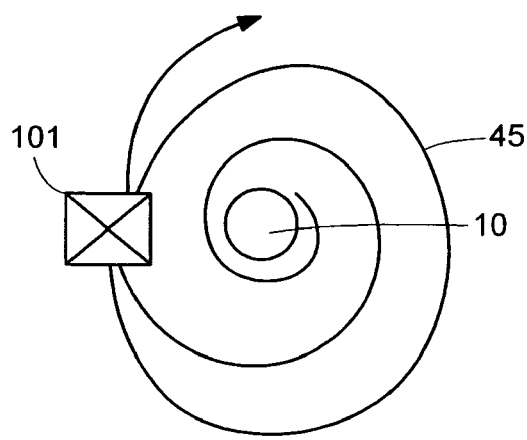
FIG. 6C is a schematic representation of the coverage pattern for yet another alternative embodiment of SPIRAL behavior.

In spiral mode, various actions can be taken when an obstacle is encountered. For example, the robot could (a) seek to avoid the obstacle and continue the spiral in the counter-clockwise direction, (b) seek to avoid the obstacle and continue the spiral in the opposite direction (e.g. changing from counter-clockwise to clockwise), or (c) change operational modes. Continuing the spiral in the opposite direction is known as reflective spiraling and is represented in FIG. 6C, where the robot 10 reverses its movement path 45 when it comes into contact with obstacle 101. In a preferred embodiment, as detailed in step 220, the robot 10 exits spot cleaning mode upon the first obstacle encountered by a bump sensor 12 or 13.

While a preferred embodiment describes a spiral motion for spot coverage, any self-bounded area can be used, including but not limited to regular polygon shapes such as squares, hexagons, ellipses, etc.

Operational Mode: Wall/Obstacle Following

Wall following or, in the case of a cleaning robot, edge cleaning, allows the user to clean only the edges of a room or the edges of objects within a room. The user places the robot 10 on the floor near an edge to be cleaned and selects the edge-cleaning operational mode. The robot 10 then moves in such a way that it follows the edge and cleans all areas brought into contact with the cleaning head 30 of the robot.

Figure 8A:
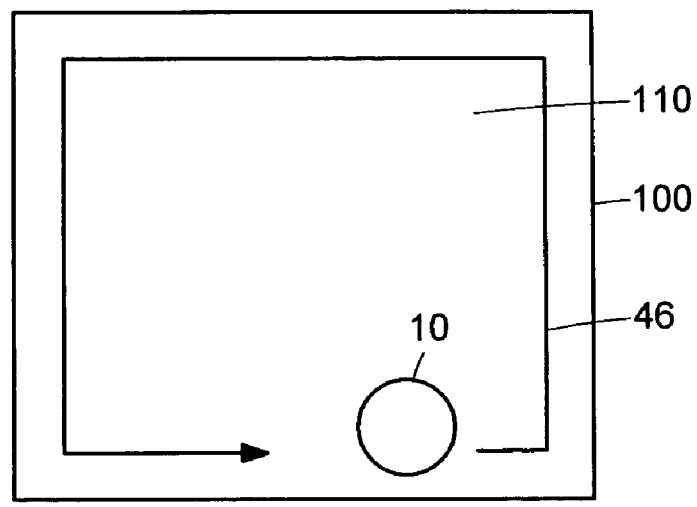
FIGS. 8A & 8B are schematic representations of the coverage pattern for a preferred embodiment of operation in obstacle following mode.
Figure 8B:
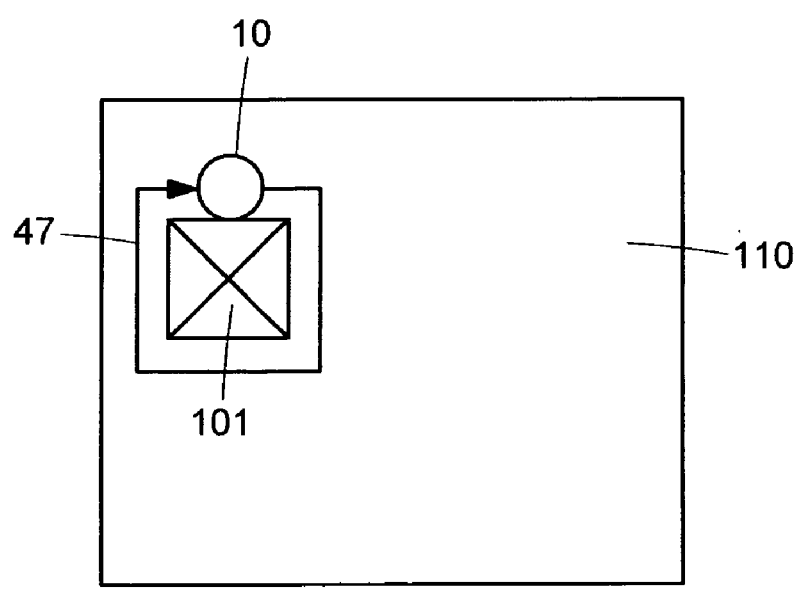

The movement of the robot 10 in a room 110 is shown in FIG. 8A, 8B. In FIG. 8A, the robot 10 is placed along wall 100, with the robot's dominant side next to the wall. The robot then runs along the wall indefinitely following movement path 46. Similarly, in FIG. 8B, the robot 10 is placed in the proximity of an obstacle 101. The robot then follows the edge of the obstacle 101 indefinitely following movement path 47.

In a preferred embodiment, in the wall-following mode, the robot uses the wall-following sensor 16 to position itself a set distance from the wall. The robot then proceeds to travel along the perimeter of the wall. As shown in FIGS. 8A & 8B, in a preferred embodiment, the robot 10 is not able to distinguish between a wall 100 and another solid obstacle 101.

Figure 9A:
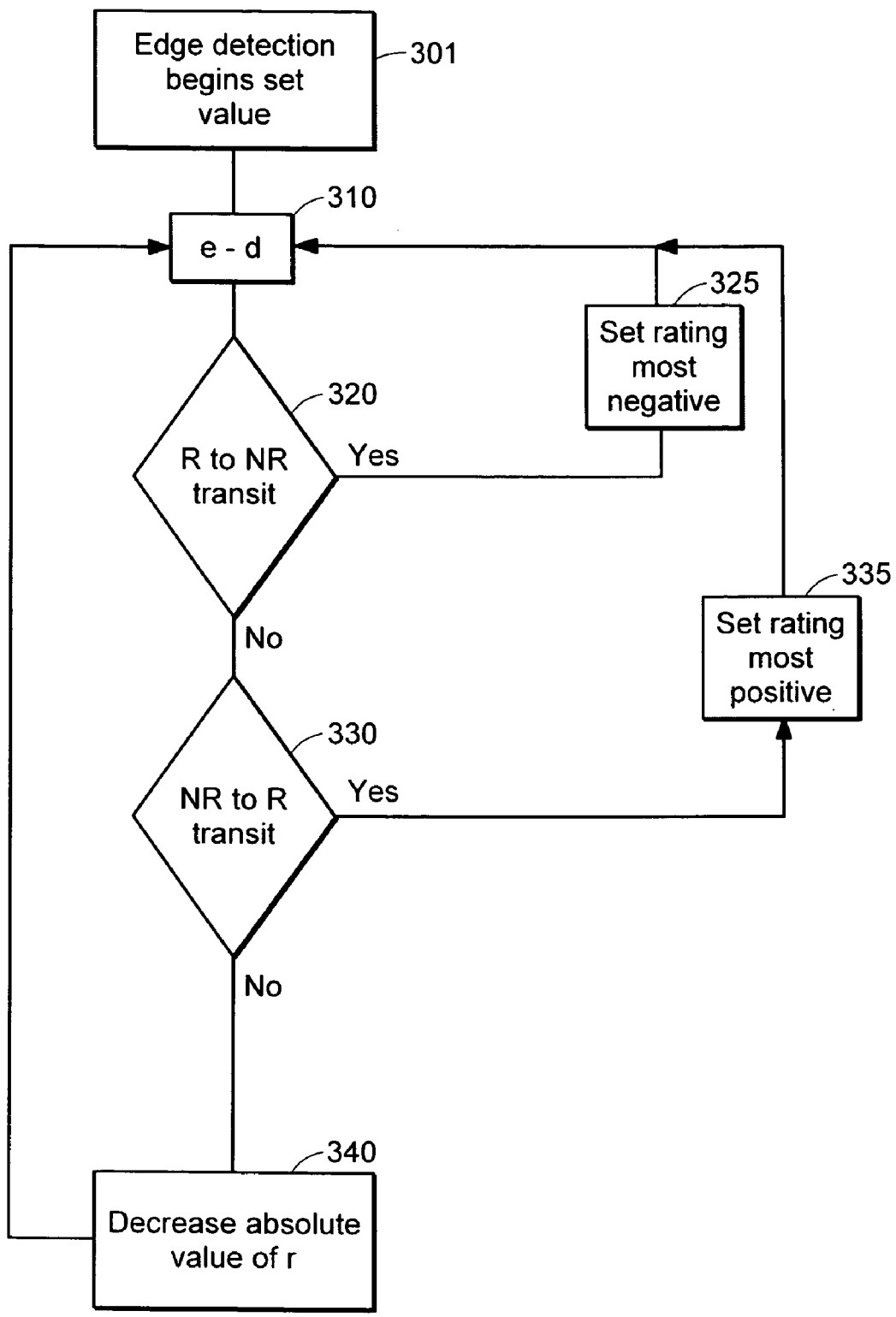
FIG. 9A is a flow-chart illustration of the obstacle following algorithm of a preferred embodiment of the invention.

The method used in a preferred embodiment for following the wall is detailed in FIG. 9A and provides a smooth wall following operation even with a one-bit sensor. (Here the one-bit sensor detects only the presence or absence of the wall within a particular volume rather than the distance between wall and sensor.) Other methods of detecting a wall or object can be used such as bump sensing or sonar sensors.

Once the wall-following operational mode, or WALL FOLLOWING behavior of a preferred embodiment, is initiated (step 301), the robot first sets its initial value for the steering at $r_0$. The WALL-FOLLOWING behavior then initiates the emit-detect routine in the wall-follower sensor 16 (step 310). The existence of a reflection for the IR transmitter portion of the sensor 16 translates into the existence of an object within a predetermined distance from the sensor 16. The WALL-FOLLOWING behavior then determines whether there has been a transition from a reflection (object within range) to a non-reflection (object outside of range) (step 320). If there has been a transition (in other words, the wall is now out of range), the value of r is set to its most negative value and the robot will veer slightly to the right (step 325). The robot then begins the emit-detect sequence again (step 310). If there has not been a transition from a reflection to a non-reflection, the wall-following behavior then determines whether there has been a transition from non-reflection to reflection (step 330). If there has been such a transition, the value of r is set to its most positive value and the robot will veer slightly left (step 335).

In the absence of either type of transition event, the wall-following behavior reduces the absolute value of r (step 340) and begins the emit-detect sequence (step 310) anew. By decreasing the absolute value of r, the robot 10 begins to turn more sharply in whatever direction it is currently heading. In a preferred embodiment, the rate of decreasing the absolute value of r is a constant rate dependant on the distance traveled.

Figure 8C:
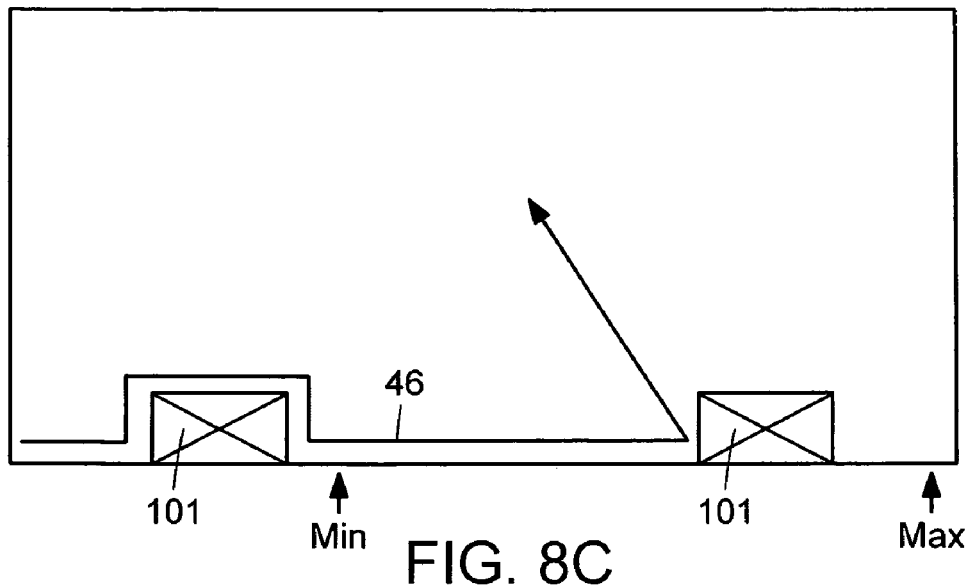
FIG. 8C is a schematic illustration of the termination of the obstacle following mode when an obstacle is encountered after the mobile robot has traveled a minimum distance.
Figure 8D:
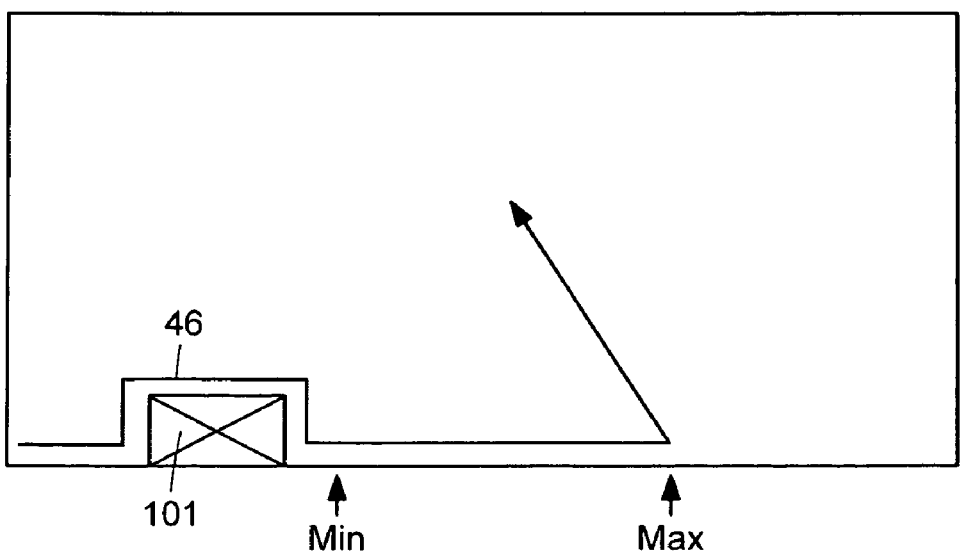
FIG. 8D is a schematic illustration of the termination of the obstacle following mode after the mobile robot has traveled a maximum distance.

The wall follower mode can be continued for a predetermined or random time, a predetermined or random distance or until some additional criteria are met (e.g. bump sensor is activated, etc.). In one embodiment, the robot continues to follow the wall indefinitely. In a preferred embodiment, as shown in FIGS. 8C & 8D wherein reference numeral 46 identifies the movement of the robot, minimum and maximum travel distances are determined, whereby the robot will remain in WALL-FOLLOWING behavior until the robot has either traveled the maximum distance (FIG. 8D) or traveled at least the minimum distance and encountered an obstacle 101 (FIG. 8C). This implementation of WALL-FOLLOWING behavior ensures the robot spends an appropriate amount of time in WALL-FOLLOWING behavior as compared to its other operational modes, thereby decreasing systemic neglect and distributing coverage to all areas. By increasing wall following, the robot is able to move in more spaces, but the robot is less efficient at cleaning any one space. In addition, by tending to exit WALL-FOLLOWING behavior after obstacle detection, the robot increases its perceived effectiveness.

Figure 9B:
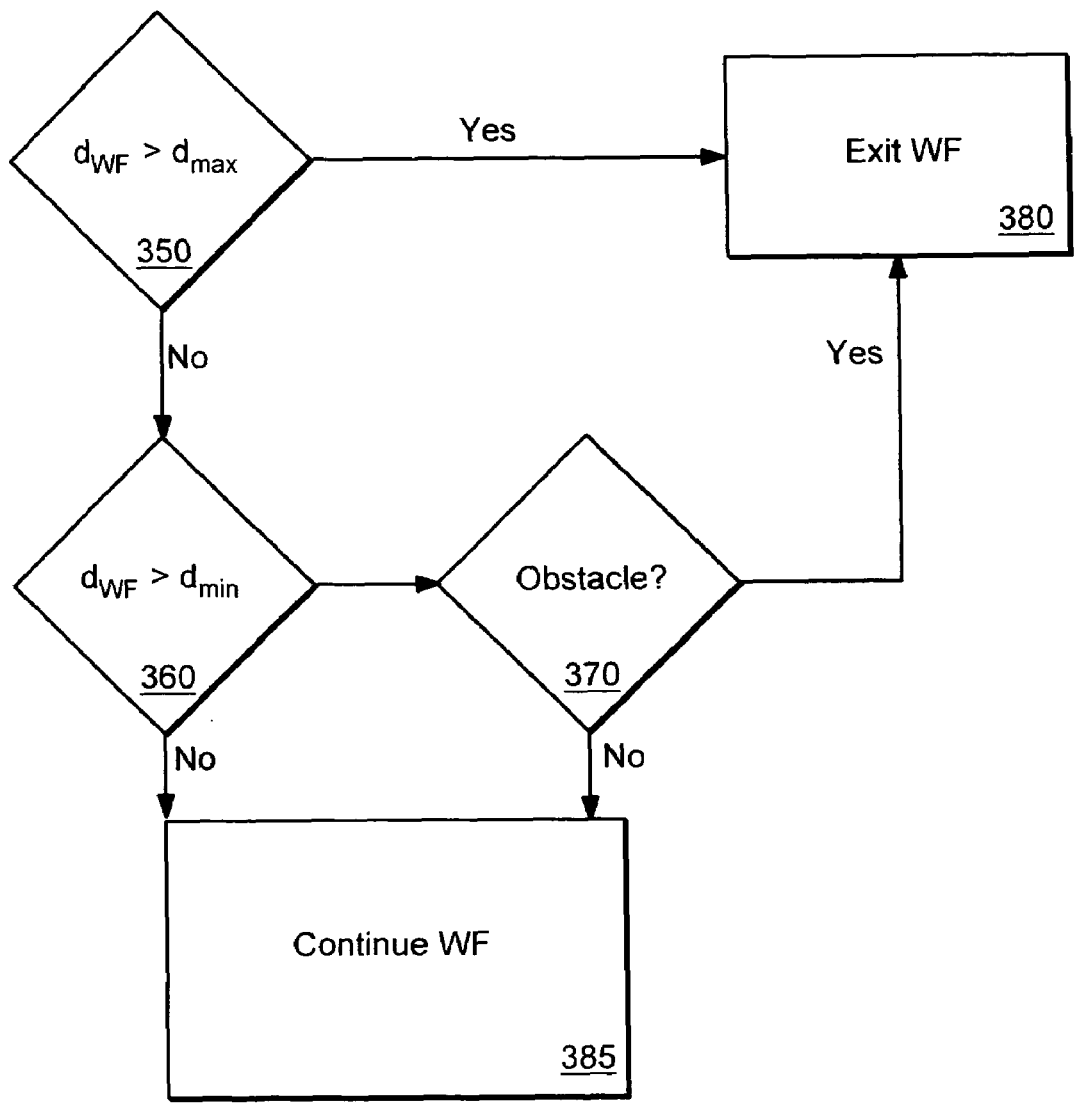
FIG. 9B is a flow-chart illustration of a preferred algorithm for determining when to exit obstacle following mode.

FIG. 9B is a flow-chart illustration showing this embodiment of determining when to exit WALL-FOLLOWING (WF) behavior. The robot first determines the minimum distance to follow the wall ($d_{min}$) and the maximum distance to follow the wall ($d_{max}$). While in wall (or obstacle) following mode, the control system tracks the distance the robot has traveled in that mode ($d_{WF}$). If $d_{WF}$ is greater than $d_{max}$ (step 350), then the robot exits wall-following mode (step 380). If, however, $d_{WF}$ is less than $d_{max}$ (step 350) and $d_{WF}$ is less than $d_{min}$ (step 360), the robot remains in wall-following mode (step 385). If $d_{WF}$ is greater than $d_{min}$ (step 360) and an obstacle is encountered (step 370), the robot exits wall-following mode (step 380).

Theoretically, the optimal distance for the robot to travel in WALL-FOLLOWING behavior is a function of room size and configuration and robot size. In a preferred embodiment, the minimum and maximum distances to remain in WALL-FOLLOWING are set based upon the approximate room size, the robots width and a random component, where by the average minimum travel distance is 2w/p, where w is the width of the work element of the robot and p is the probability that the robot will enter WALL-FOLLOWING behavior in a given interaction with an obstacle. By way of example, in a preferred embodiment, w is approximately between 15 cm and 25 cm, and p is 0.095 (where the robot encounters 6 to 15 obstacles, or an average of 10.5 obstacles, before entering an obstacle following mode). The minimum distance is then set randomly as a distance between approximately 115 cm and 350 cm; the maximum distance is then set randomly as a distance between approximately 170 cm and 520 cm. In certain embodiments the ratio between the minimum distance to the maximum distance is 2:3. For the sake of perceived efficiency, the robot's initial operation in a obstacle following mode can be set to be longer than its later operations in obstacle following mode. In addition, users may place the robot along the longest wall when starting the robot, which improves actual as well as perceived coverage.

The distance that the robot travels in wall following mode can also be set by the robot depending on the number and frequency of objects encountered (as determined by other sensors), which is a measure of room "clutter." If more objects are encountered, the robot would wall follow for a greater distance in order to get into all the areas of the floor. Conversely, if few obstacles are encountered, the robot would wall follow less in order to not over-cover the edges of the space in favor of passes through the center of the space. An initial wall-following distance can also be included to allow the robot to follow the wall a longer or shorter distance during its initial period where the WALL-FOLLOWING behavior has control.

In a preferred embodiment, the robot may also leave wall-following mode if the robot turns more than, for example, 270 degrees and is unable to locate the wall (or object) or if the robot has turned a total of 360 degrees since entering wall-following mode.

In certain embodiments, when the WALL-FOLLOWING behavior is active and there is a bump, the ALIGN behavior becomes active. The ALIGN behavior turns the robot counter-clockwise to align the robot with the wall. The robot always turns a minimum angle to avoid getting the robot getting into cycles of many small turns. After it has turned through its minimum angle, the robot monitors its wall sensor and if it detects a wall and then the wall detection goes away, the robot stops turning. This is because at the end of the wall follower range, the robot is well aligned to start WALL-FOLLOWING. If the robot has not seen its wall detector go on and then off by the time it reaches its maximum angle, it stops anyway. This prevents the robot from turning around in circles when the wall is out of range of its wall sensor. When the most recent bump is within the side 60 degrees of the bumper on the dominant side, the minimum angle is set to 14 degrees and the maximum angle is 19 degrees. Otherwise, if the bump is within 30 degrees of the front of the bumper on the dominant side or on the non-dominant side, the minimum angle is 20 degrees and the maximum angle is 44 degrees. When the ALIGN behavior has completed turning, it cedes control to the WALL-FOLLOWING behavior Operational Mode: Room Coverage The third operational mode is here called room-coverage or room cleaning mode, which allows the user to clean any area bounded by walls, stairs, obstacles or other barriers. To exercise this option, the user places the robot on the floor and selects room-cleaning mode. The robot them moves about the room cleaning all areas that it is able to reach.

Figure 10:
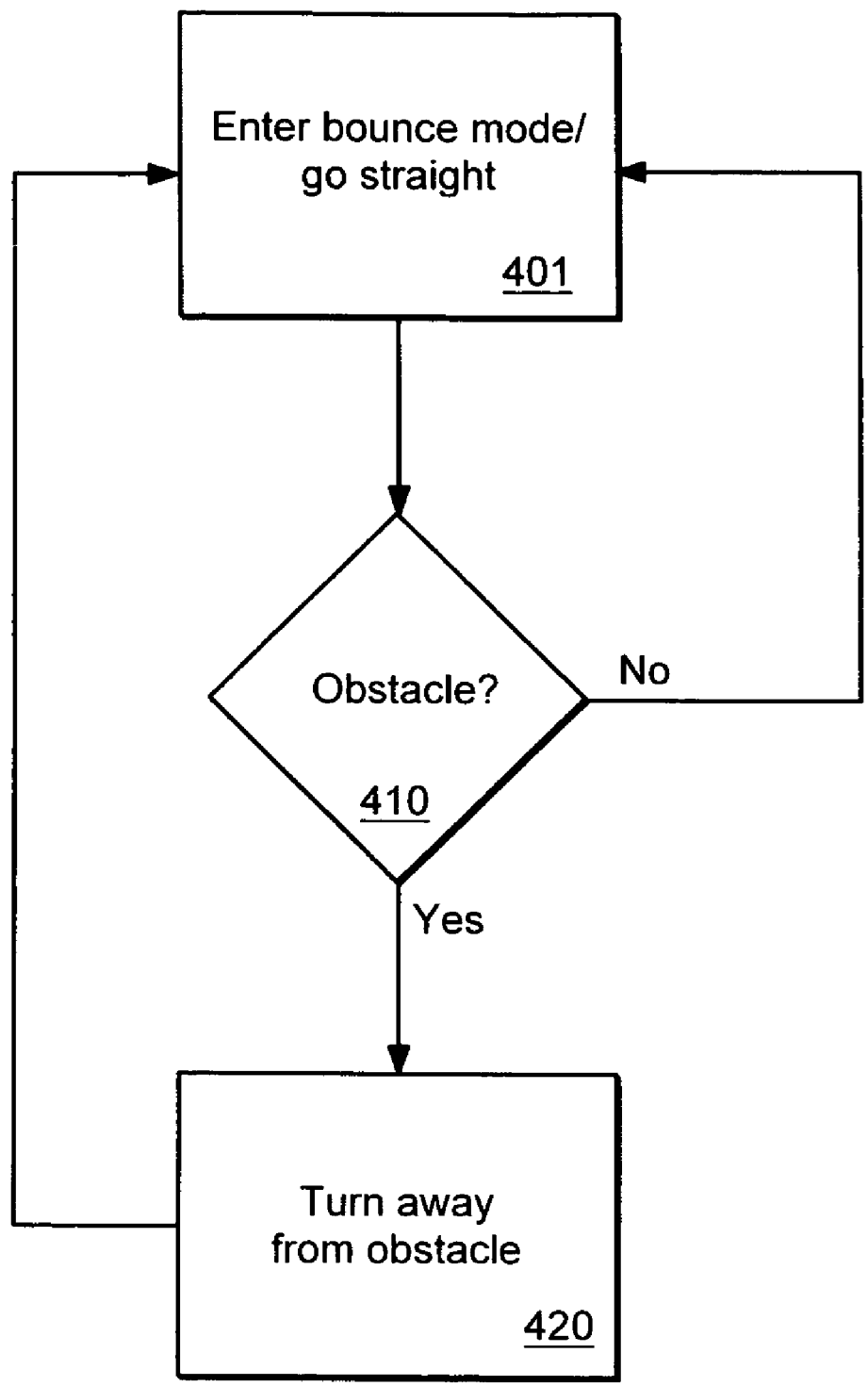
FIG. 10 is a schematic representation of the coverage pattern for a preferred embodiment of BOUNCE behavior.
Figure 11:
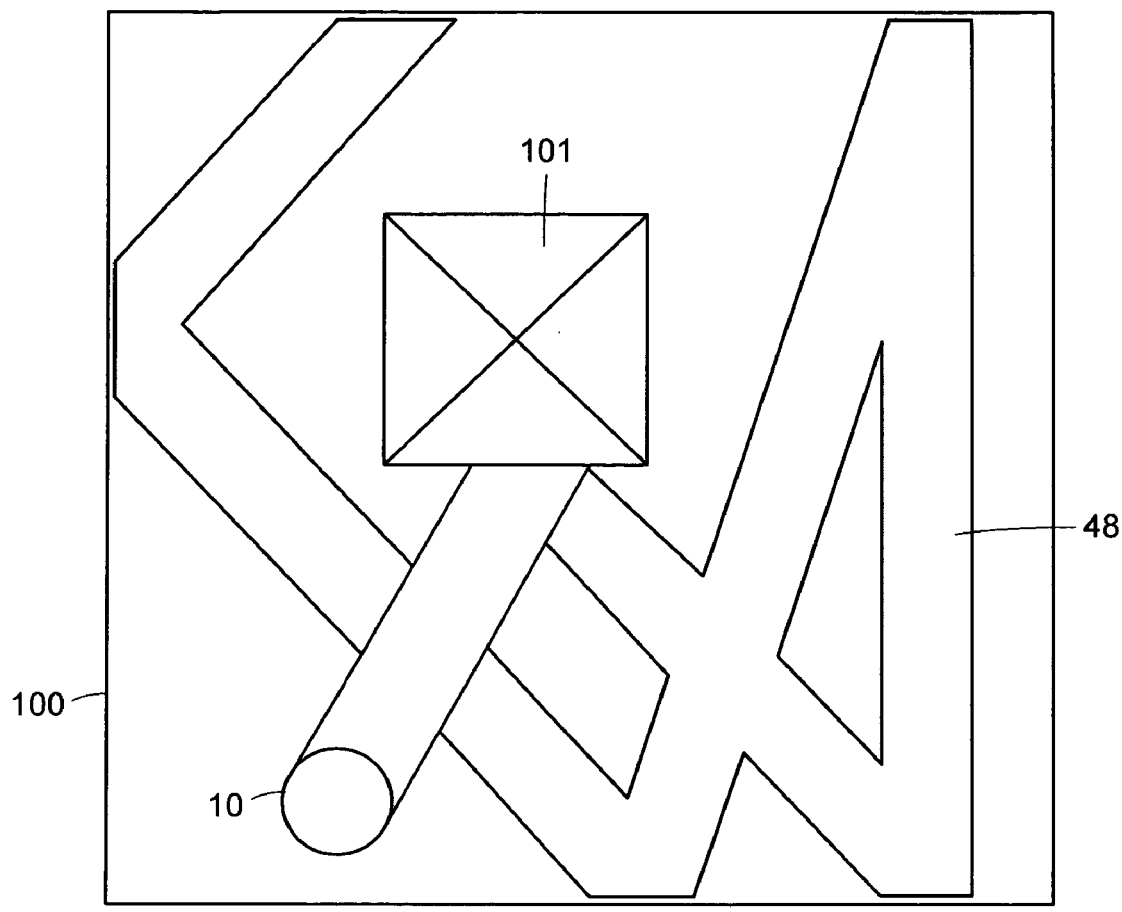
FIG. 11 is a flow-chart illustration of the room coverage algorithm of a preferred embodiment of the invention.

In a preferred embodiment, the method of performing the room cleaning behavior is a BOUNCE behavior in combination with the STRAIGHT LINE behavior. As shown in FIG. 10, the robot 10 travels until a bump sensor 12 and/or 13 is activated by contact with an obstacle 101 or a wall 100 (see FIG. 11). The robot 10 then turns and continues to travel. A sample movement path is shown in FIG. 11 as line 48.

The algorithm for random bounce behavior is set forth in FIG. 10. The robot 10 continues its forward movement (step 401) until a bump sensor 12 and/or 13 is activated (step 410). The robot 10 then calculates an acceptable range of new directions based on a determination of which bump sensor or sensors have been activated (step 420). A determination is then made with some random calculation to choose the new heading within that acceptable range, such as 90 to 270 degrees relative to the object the robot encountered. The angle of the object the robot has bumped is determined as described above using the timing between the right and left bump sensors. The robot then turns to its new headings. In a preferred embodiment, the turn is either clockwise or counterclockwise depending on which direction requires the least movement to achieve the new heading. In other embodiments, the turn is accompanied by movement forward in order to increase the robot's coverage efficiency.

The statistics of the heading choice made by the robot can be distributed uniformly across the allowed headings, i.e. there is an equivalent chance for any heading within the acceptable range. Alternately we can choose statistics based on a Gaussian or other distribution designed to preferentially drive the robot perpendicularly away from a wall.

In other embodiments, the robot could change directions at random or predetermined times and not based upon external sensor activity. Alternatively, the robot could continuously make small angle corrections based on long range sensors to avoid even contacting an object and, thereby cover the surface area with curved paths In a preferred embodiment, the robot stays in room-cleaning mode until a certain number of bounce interactions are reached, usually between 6 and 13.

2. Escape Behaviors

There are several situations the robot may encounter while trying to cover an area that prevent or impede it from covering all of the area efficiently. A general class of sensors and behaviors called escape behaviors are designed to get the robot out of these situations, or in extreme cases to shut the robot off if it is determined it cannot escape. In order to decide whether to give an escape behavior priority among the various behaviors on the robot, the robot determines the following: (1) is an escape behavior needed; (2) if yes, which escape behavior is warranted?

By way of example, the following situations illustrate situations where an escape behavior is needed for an indoor cleaning robot and an appropriate behavior to run:

(i) Situation 1. The robot detects a situation where it might get stuck—for example, a high spot in a carpet or near a lamp base that acts like a ramp for the robot. The robot performs small "panic" turn behaviors to get out of the situation;

(ii) Situation 2. The robot is physically stuck—for example, the robot is wedged under a couch or against a wall, tangled in cords or carpet tassels, or stuck on a pile of electrical cords with its wheels spinning. The robot performs large panic turn behaviors and turns off relevant motors to escape from the obstruction;

(iii) Situation 3. The robot is in a small, confined area—for example, the robot is between the legs of a chair or in the open area under a dresser, or in a small area created by placing a lamp close to the corner of a room. The robot edge follows using its bumper and/or performs panic turn behaviors to escape from the area; and (iv) Situation 4. The robot has been stuck and cannot free itself—for example, the robot is in one of the cases in category (ii), above, and has not been able to free itself with any of its panic behaviors. In this case, the robot stops operation and signals to the user for help. This preserves battery life and prevents damage to floors or furniture.

In order to detect the need for each escape situation, various sensors are used. For example:

(i) Situation 1. (a) When the brush or side brush current rise above a threshold, the voltage applied to the relevant motor is reduced. Whenever this is happening, a stall rate variable is increased. When the current is below the threshold, the stall rate is reduced. If the stall level rises above a low threshold and the slope of the rate is positive, the robot performs small panic turn behaviors. It only repeats these small panic turn behaviors when the level has returned to zero and risen to the threshold again. (b) Likewise, there is a wheel drop level variable which is increased when a wheel drop event is detected and is reduced steadily over time. When a wheel drop event is detected and the wheel drop level is above a threshold (meaning there have been several wheel drops recently), the robot performs small or large panic turn behaviors depending on the wheel drop level.

(ii) Situation 2. (a) When the brush stall rate rises above a high threshold and the slope is positive, the robot turns off the brush for 13 seconds and performs large panic turn behaviors at 1, 4, and 7 seconds. At the end of the 13 seconds, the brush is turned back on. (b) When the drive stall rate rises above a medium threshold and the slope is positive, the robot performs large panic turn behaviors continuously. (c) When the drive stall rate rises above a high threshold, the robot turns off all of the motors for 15 seconds. At the end of the 15 seconds, the motors are turned back on. (d) When the bumper of the robot is held in constantly for 5 seconds (as in a side wedging situation), the robot performs a large panic turn behavior. It repeats the panic turn behavior every 5 seconds until the bumper is released. (e) When the robot has gotten no bumps for a distance of 20 feet, it assumes that it might be stuck with its wheels spinning. To free itself, it performs a spiral. If has still not gotten a bump for 10 feet after the end of the spiral, performs a large panic turn behavior. It continues this every 10 feet until it gets a bump.

(iii) Situation 3. (a) When the average distance between bumps falls below a low threshold, the robot performs edge following using its bumper to try to escape from the confined area. (b) When the average distance between bumps falls below a very low threshold, the robot performs large panic turn behaviors to orient it so that it may better be able to escape from the confined area.

(iv) Situation 4. (a) When the brush has stalled and been turned off several times recently and the brush stall rate is high and the slope is positive, the robot shuts off. (b) When the drive has stalled and the motors turned off several times recently and the drive stall rate is high and the slope is positive, the robot shuts off. (c) When any of the wheels are dropped continuously for greater than 2 seconds, the robot shuts off. (d) When many wheel drop events occur in a short time, the robot shuts off. (e) When any of the cliff sensors sense a cliff continuously for 10 seconds, the robot shuts off. (f) When the bump sensor is constantly depressed for a certain amount of time, for example 10 seconds, it is likely that the robot is wedged, and the robot shuts off.

Figure 12A:
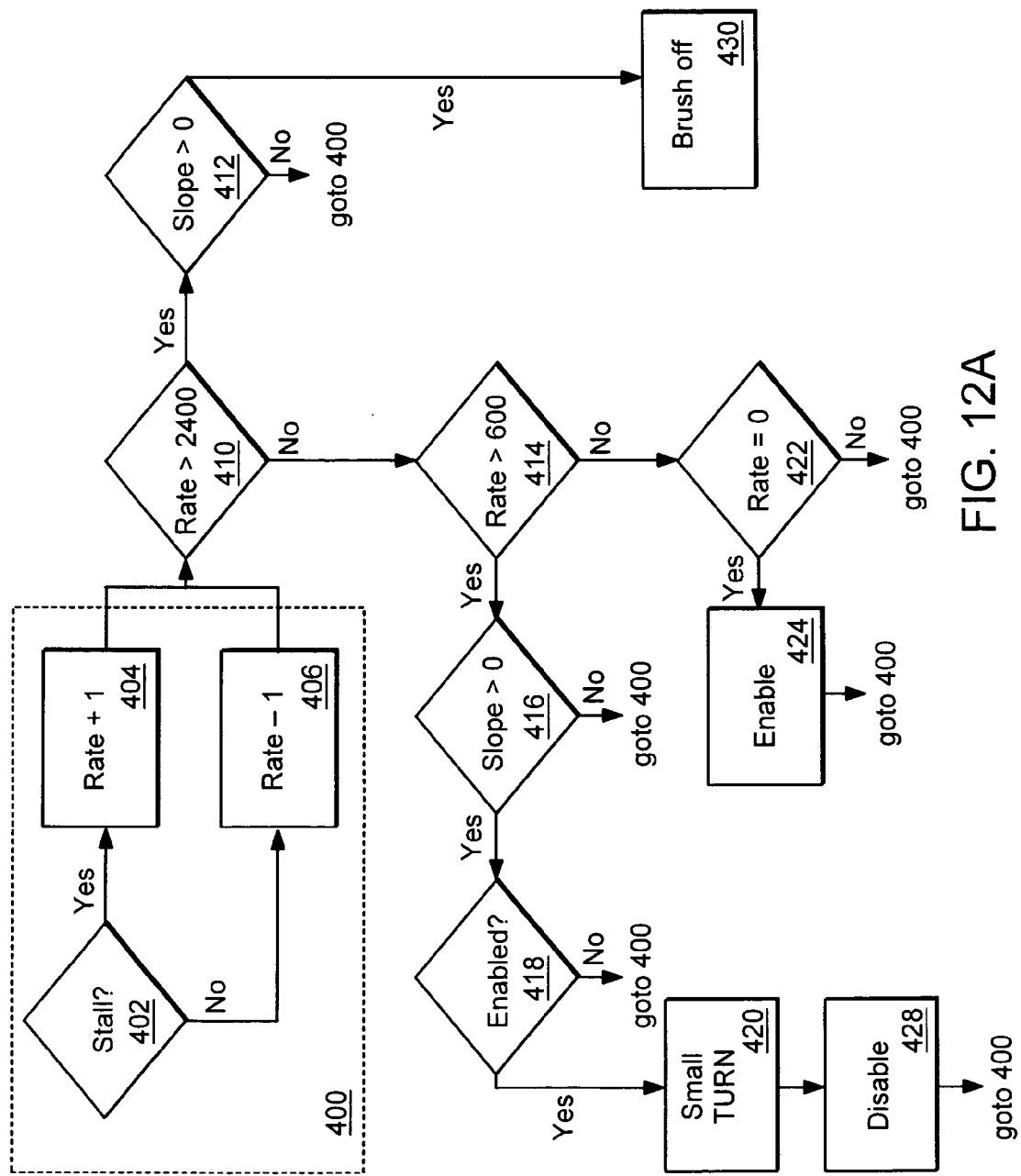
FIGS. 12A & 12B are flow-chart illustrations of an exemplary escape behavior.
Figure 12B:
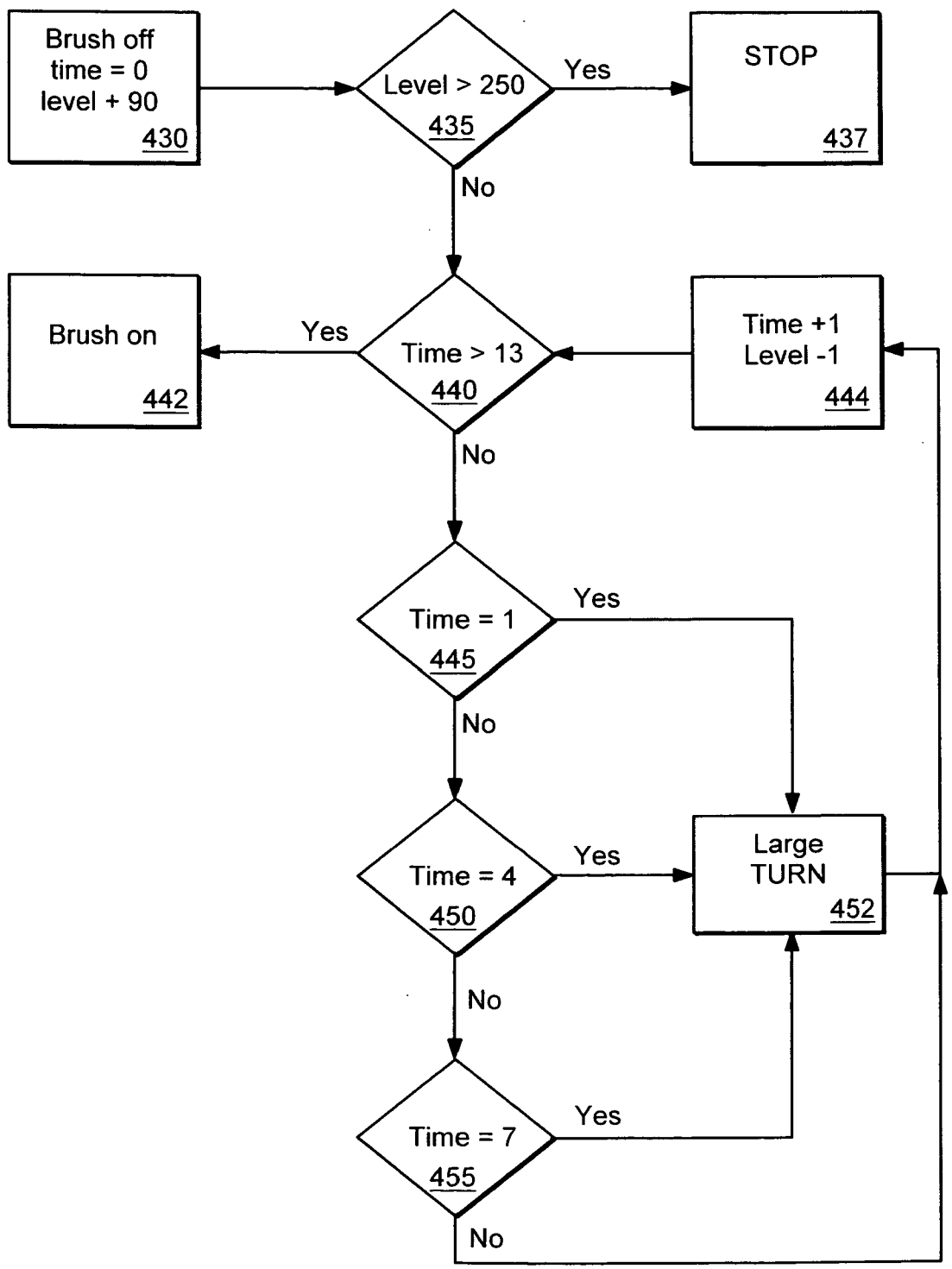

As a descriptive example, FIGS. 12A & 12B illustrate the analysis used in a preferred embodiment for identifying the need for an escape behavior relative to a stalled brush motor, as described above in Situations 1, 2 and 4. Each time the brush current exceeds a given limit for the brush motor (step 402), a rate register is incremented by 1 (step 404); if no limit is detected, the rate register is decremented by 1 (step 406). A separate slope register stores the recent values for a recent time period such as 120 cycles. If the rate is above 600 (where 600 corresponds to one second of constant stall) (step 414) and the slope is positive (step 416), then the robot will run an escape behavior (step 420) if the escape behavior is enabled (step 418). The escape behaviors are disabled after running (step 428) until the rate has returned to zero (step 422), re-enabled (step 424) and risen to 600 again. This is done to avoid the escape behavior being triggered constantly at rates above 600.

If, however, the rate is above 2400 (step 410) and the slope is positive (step 412), the robot will run a special set of escape behaviors, shown in FIG. 12B. In a preferred embodiment, the brush motor will shut off (step 430), the "level" is incremented by a predetermined amount (50 to 90) (step 430), the stall time is set (step 430), and a panic behavior (step 452) is performed at 1 second (step 445), 4 seconds (step 450) and 7 seconds (step 455) since the brush shut off. The control system then restarts the brush at 13 seconds (steps 440 & 442). Level is decremented by 1 every second (steps 444). If level reaches a maximum threshold (step 435), the robot ceases all operation (step 437). In addition, the robot may take additional actions when certain stalls are detected, such as limiting the voltage to the motor to prevent damage to the motor.

A preferred embodiment of the robot has four escape behaviors: TURN, EDGE, WHEEL DROP and SLOW.

TURN. The robot turns in place in a random direction, starting at a higher velocity (approximately twice of its normal turning velocity) and decreasing to a lower velocity (approximately one-half of its normal turning velocity). Varying the velocity may aid the robot in escaping from various situations. The angle that the robot should turn can be random or a function of the degree of escape needed or both. In a preferred embodiment, in low panic situations the robot turns anywhere from 45 to 90 degrees, and in high panic situations the robot turns anywhere from 90 to 270 degrees.

EDGE. The robot follows the edge using its bump sensor until (a) the robot turns 60 degrees without a bump or (b) the robot cumulatively has turned more than 170 degrees since the EDGE behavior initiated. The EDGE behavior may be useful if the average bump distance is low (but not so low as to cause a panic behavior). The EDGE behavior allows the robot to fit through the smallest openings physically possible for the robot and so can allow the robot to escape from confined areas.

WHEEL DROP. The robot back drives wheels briefly, then stops them. The back driving of the wheels helps to minimize false positive wheel drops by giving the wheels a small kick in the opposite direction. If the wheel drop is gone within 2 seconds, the robot continues normal operation.

SLOW. If a wheel drop or a cliff detector goes off, the robot slows down to speed of 0.235 m/s (or 77% of its normal speed) for a distance of 0.5 m and then ramps back up to its normal speed.

In addition to the coverage behaviors and the escape behaviors, the robot also might contain additional behaviors related to safety or usability. For example, if a cliff is detected for more than a predetermined amount of time, the robot may shut off. When a cliff is first detected, a cliff avoidance response behavior takes immediate precedence over all other behaviors, rotating the robot away from the cliff until the robot no longer senses the cliff. In a preferred embodiment, the cliff detection event does not cause a change in operational modes. In other embodiments, the robot could use an algorithm similar to the wall-following behavior to allow for cliff following.

The individual operation of the three operational modes has been described above; we now turn to the preferred mode of switching between the various modes.

In order to achieve the optimal coverage and cleaning efficiency, a preferred embodiment uses a control program that gives priority to various coverage behaviors. (Escape behaviors, if needed, are always given a higher priority.) For example, the robot 10 may use the wall following mode for a specified or random time period and then switch operational modes to the room cleaning. By switching between operational modes, the robotic device of the present invention is able to increase coverage, cleaning efficiency and perceived effectiveness.

Figure 13A:
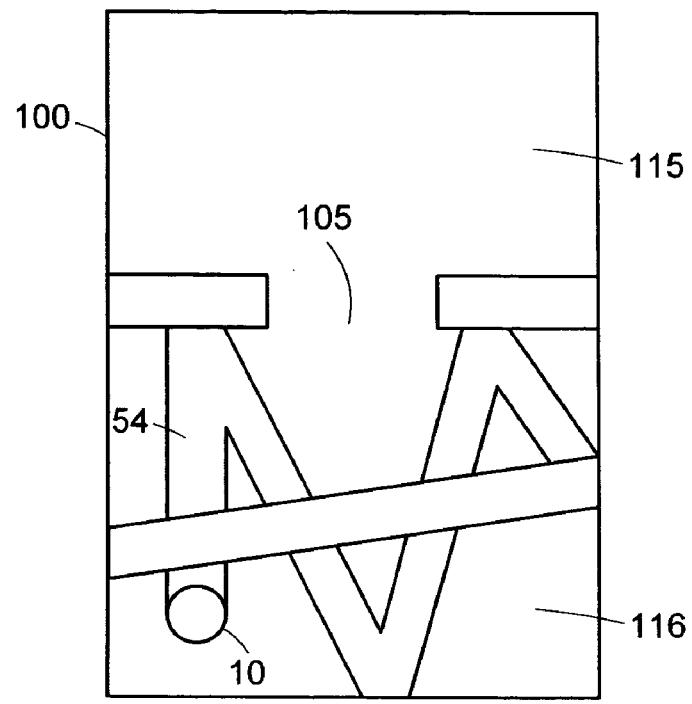
FIG. 13A is a schematic representation of the coverage pattern of a mobile robot with only a single operational mode.
Figure 13B:
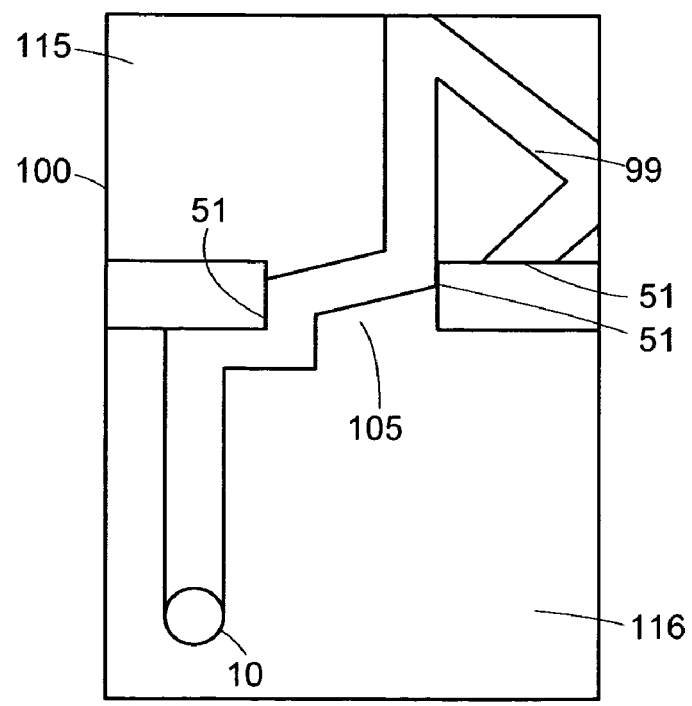
FIG. 13B is a schematic representation of the coverage pattern for a preferred embodiment of the instant invention using obstacle following and room coverage modes.

By way of example, FIGS. 13A & 13B show a mobile robot 10 in a "dog bone" shaped environment in which two rooms 115 & 116 of roughly equal dimensions are connected by a narrow passageway 105. (This example illustrates the robot diffusion problem discussed earlier.) This arrangement is a simplified version of typical domestic environments, where the "dog bone" may be generated by the arrangements of obstacles within the room. In FIG. 13A, the path of robot 10 is traced as line 54 as robot 10 operates on in random bounce mode. The robot 10 is unable to move from room 116 into 115 during the limited run because the robot's random behavior did not happen to lead the robot through passageway 105. This method leaves the coverage far less than optimal and the cleaning rate decreased due to the number of times the robot 10 crosses its own path.

FIG. 13B shows the movement of a preferred embodiment of robot 10, whereby the robot cycles between BOUNCE and WALL FOLLOWING behaviors. As the robot follows path 99, each time the robot 10 encounters a wall 100, the robot follows the wall for a distance equal to twice the robot's diameter. The portions of the path 99 in which the robot 10 operates in wall following mode are labeled 51. This method provides greatly increased coverage, along with attendant increases in cleaning rate and perceived effectiveness.

Figure 14:
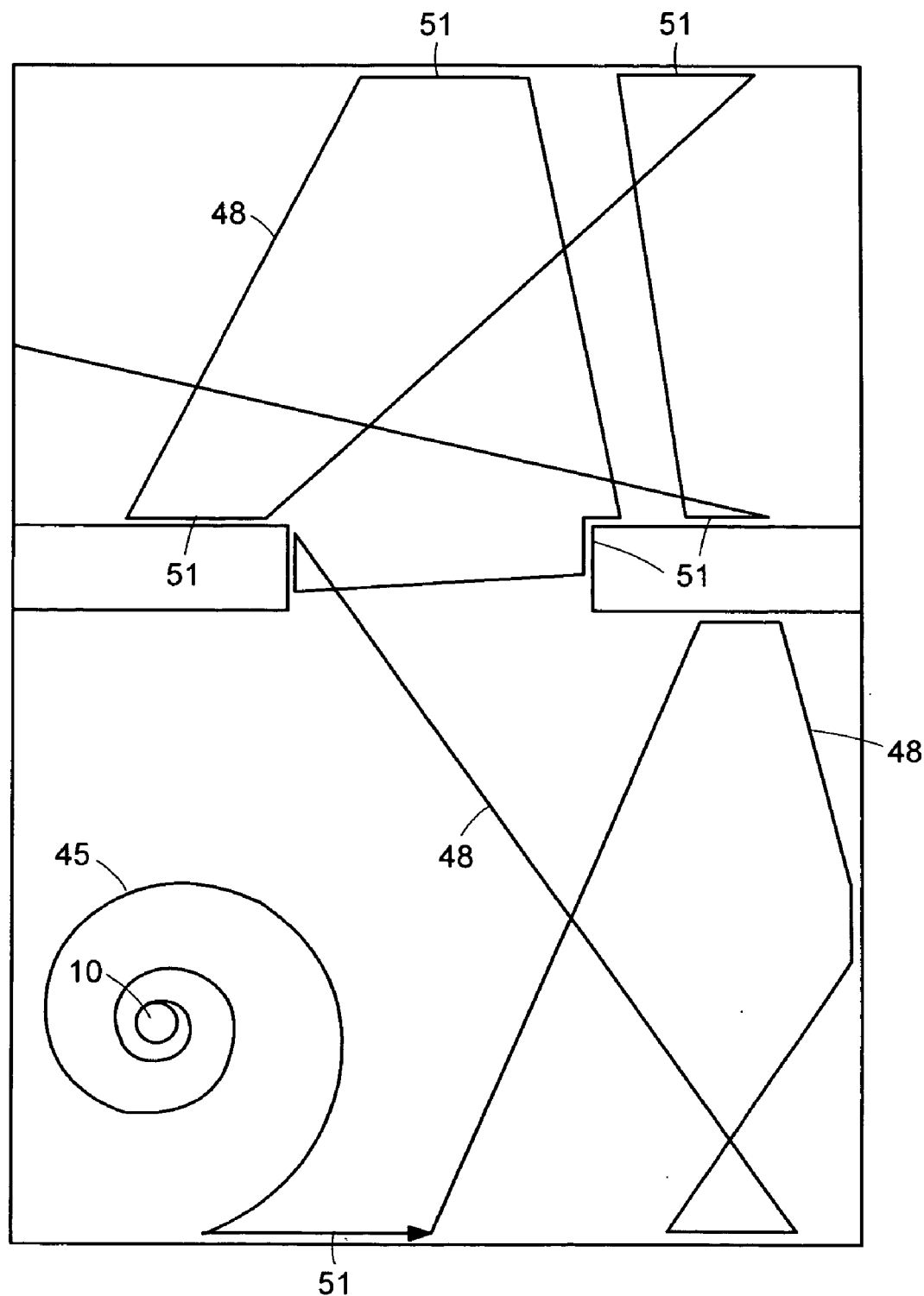
FIG. 14 is a schematic representation of the coverage pattern for a preferred embodiment of the instant invention using spot-coverage, obstacle following and room coverage modes.

Finally, a preferred embodiment of the present invention is detailed in FIG. 14, in which all three operational modes are used. In a preferred embodiment, the device 10 begins in spiral mode (movement line 45). If a reflective spiral pattern is used, the device continues in spiral mode until a predetermined or random number of reflective events has occurred. If a standard spiral is used (as shown in FIG. 14), the device should continue until any bump sensor event. In a preferred embodiment, the device immediately enters wall following mode after the triggering event.

In a preferred embodiment, the device then switches between wall following mode (movement lines 51) and random bounce modes (movement lines 48) based on bump sensor events or the completion of the wall following algorithm. In one embodiment, the device does not return to spiral mode; in other embodiments, however, the device can enter spiral mode based on a predetermined or random event.

In a preferred embodiment, the robot keeps a record of the average distance traveled between bumps. The robot then calculates an average bump distance (ABD) using the following formula: (¾×ABD)+(¼×most recent distance between bumps). If the ABD is a above a predetermined threshold, the robot will again give priority to the SPIRAL behavior. In still other embodiments, the robot may have a minimum number of bump events before the SPIRAL behavior will again be given priority. In other embodiments, the robot may enter SPIRAL behavior if it travels a maximum distance, for example 20 feet, without a bump event.

In addition, the robot can also have conditions upon which to stop all operations. For example, for a given room size, which can be manually selected, a minimum and maximum run time are set and a minimum total distance is selected. When the minimum time and the minimum distance have been reached the robot shuts off. Likewise, if the maximum time has been reached, the robot shuts off.

Of course, a manual control for selecting between operational modes can also be used. For example, a remote control could be used to change or influence operational modes or behaviors. Likewise, a switch mounted on the shell itself could be used to set the operation mode or the switching between modes. For instance, a switch could be used to set the level of clutter in a room to allow the robot a more appropriate coverage algorithm with limited sensing ability.

One of skill in the art will recognize that portions of the instant invention can be used in autonomous vehicles for a variety of purposes besides cleaning. The scope of the invention should be determined by the appended claims and their legal equivalents, rather than by the examples given.

We claim:

1. A mobile robot, comprising:
   a controllable drive element operable to move the robot over a surface;
   an obstacle detection sensor; and
   a control system operatively connected to said obstacle detection sensor and said controllable drive element;
   wherein said control system is configured to operate the robot in a plurality of operational modes including an obstacle-following mode in which said robot is controlled to travel adjacent to a detected obstacle for a distance of at least twice a working width of the robot in response to detection of the detected obstacle.

2. A mobile robot comprising:
   a controllable drive element operable to move the robot over a surface;
   an obstacle encounter sensor; and
   a control system operatively connected to said obstacle encounter sensor and said controllable drive element;
   said control system configured to operate the robot in a plurality of operational modes, and to switch between the modes in real time, said plurality of operational modes comprising:
   a spot-coverage mode whereby the robot operates in an isolated area,
   an obstacle following mode in which said robot follows a perimeter of an encountered obstacle, and
   a bounce mode in which the robot travels in a direction away from the perimeters of encountered obstacles;
   wherein said control system is configured to operate the robot in obstacle-following mode such that an average distance that the robot follows the perimeter of an encountered obstacle per obstacle-following mode initiation is equal to about twice a ratio of a working width (w) of the robot
   to a probability (p) of entering the obstacle-following mode upon an obstacle encounter.

3. The mobile robot of claim 2 wherein the robot enters the obstacle following mode upon every encounter or an obstacle, and the average distance that the robot travels adjacent to each obstacle is about twice the working width of the robot.

4. The mobile robot of claim 2, wherein p is less than unity, and the average distance that the robot travels adjacent to each followed obstacle is greater than about twice the working width of the robot.

5. The mobile robot of claim 2, wherein the working width of the robot is approximately between 15 cm and 25 cm, p is approximately 0.095, and wherein the robot travels adjacent to each obstacle a distance no less than a minimum travel distance that is a randomly set distance between about 115 cm and about 350 cm, and no greater than a maximum travel distance that is a randomly set distance between about 170 cm and about 520 cm.

6. The mobile robot of claim 2, wherein said control system is further configured to operate the robot to initiate obstacle-following always on a dominant side of the robot.

7. The mobile robot of claim 2, wherein said plurality of operational modes further comprises spiraling inwardly and then, in the absence of an obstacle encounter, spirally outwardly.

8. The mobile robot of claim 2, wherein said plurality of operational modes comprises spiraling outwardly and then, in response to a selected event, spiraling inwardly.

9. A mobile robot comprising:
   a controllable drive element operable to move the robot over a surface;
   an obstacle detection sensor; and
   and a control system operatively connected to said obstacle detection sensor and said controllable drive element;
   wherein said control system is configured to operate the robot in a plurality of operational modes including; a spot-covering mode in which the robot is controlled to move in a substantially spiral movement, an obstacle-following mode in which the robot is controlled to travel adjacent to a detected obstacle for a distance of at least twice a working width of the robot in response to detection of the detected obstacle, and a bounce mode in which the robot is controlled to travel substantially in a direction away from a detected obstacle;
   wherein the control system is configured to initiate obstacle-following mode in response to some obstacle detections, and to initiate bounce mode in response to other obstacle detections.

10. The mobile robot of claims 1 or 9, wherein said control system is further configured to operate the robot to initiate obstacle-following always on a dominant side of the robot.

11. The mobile robot of claims 1 or 9, wherein said plurality of operational modes further comprises spiraling inwardly and then, in the absence of an obstacle encounter, spirally outwardly.

12. The mobile robot of claims 1 or 9, wherein said plurality of operational modes comprises spiraling outwardly and then, in response to a selected event, spiraling inwardly.

* * * * *